United States Patent
Paik et al.

(10) Patent No.: US 10,885,667 B2
(45) Date of Patent: Jan. 5, 2021

(54) NORMALIZED METADATA GENERATION DEVICE, OBJECT OCCLUSION DETECTION DEVICE AND METHOD

(71) Applicant: CHUNG ANG UNIVERSITY INDUSTRY ACADEMIC COOPERATION FOUNDATION, Seoul (KR)

(72) Inventors: Joon Ki Paik, Seoul (KR); Jae Hoon Jung, Seoul (KR); In Hye Yoon, Suwon-si (KR); Seung Won Lee, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/337,790

(22) PCT Filed: Mar. 7, 2017

(86) PCT No.: PCT/KR2017/002459
§ 371 (c)(1),
(2) Date: Mar. 28, 2019

(87) PCT Pub. No.: WO2018/062647
PCT Pub. Date: Apr. 5, 2018

(65) Prior Publication Data
US 2020/0005490 A1    Jan. 2, 2020

(30) Foreign Application Priority Data

Sep. 28, 2016 (KR) .................. 10-2016-0124768
Oct. 14, 2016 (KR) .................. 10-2016-0133474

(51) Int. Cl.
*G06T 7/80* (2017.01)
*G06T 17/00* (2006.01)
(Continued)

(52) U.S. Cl.
CPC ............ *G06T 7/80* (2017.01); *G06F 16/5854* (2019.01); *G06K 9/00369* (2013.01);
(Continued)

(58) Field of Classification Search
None
See application file for complete search history.

(56) References Cited

U.S. PATENT DOCUMENTS 10,482,625 B1 * 11/2019 Adam .................. G06T 7/90
2013/0261470 A1 * 10/2013 Allison ............... A61B 5/1077
600/476

(Continued)

FOREIGN PATENT DOCUMENTS

KR    10-2012-0130788 A    12/2012

OTHER PUBLICATIONS

Korean Office Action dated Aug. 31, 2017 in connection with the counterpart Korean Patent Application No. 10-2016-0124768.

*Primary Examiner* — Tapas Mazumder
(74) *Attorney, Agent, or Firm* — Hauptman Ham, LLP

(57) ABSTRACT

Disclosed a normalized metadata generation device, and object occlusion detection device and method. A normalized metadata generation method includes generating a multi-ellipsoid based three-dimensional human model using perspective features of a plurality of two-dimensional images obtained by the multiple cameras, performing scene calibration based on the three-dimensional human model to normalize object information of the object included in the two-dimensional images, and generating normalized meta- (Continued)

data of the object from the two-dimensional images on which the scene calibration is performed.

24 Claims, 54 Drawing Sheets

(51) Int. Cl.
*G06T 7/536* (2017.01)
*G06F 16/583* (2019.01)
*G06K 9/00* (2006.01)
*G06K 9/46* (2006.01)
*G06K 9/62* (2006.01)
*G06T 7/60* (2017.01)

(52) U.S. Cl.
CPC ....... *G06K 9/00771* (2013.01); *G06K 9/4652* (2013.01); *G06K 9/6223* (2013.01); *G06T 7/536* (2017.01); *G06T 7/60* (2013.01); *G06T 17/00* (2013.01); *G06T 2207/10016* (2013.01); *G06T 2207/10024* (2013.01); *G06T 2207/30196* (2013.01); *G06T 2207/30232* (2013.01)

(56) References Cited

U.S. PATENT DOCUMENTS

| | | | |
|---|---|---|---|
| 2016/0223318 A1* | 8/2016 | Liu | G06T 7/194 |
| 2018/0075593 A1* | 3/2018 | Wang | G06K 9/00281 |
| 2018/0249177 A1* | 8/2018 | Lin | H04N 19/59 |

* cited by examiner

FIG. 13

| Name | | Description |
|---|---|---|
| ID | | Object number |
| File name | | Occurrence video file name |
| Frame | Start frame<br>End frame<br>Duration | Start frame, end frame and duration of the frame |
| Trajectory | First position<br>Second position<br>Third position<br>Last position<br>Moving distance | First position, 1/3 position, 2/3 position, last position and moving distance |
| Height (mm) | Min height<br>Median height<br>Max height | Minimum, median and maximum height of the object |
| Width (mm) | Min width<br>Median width<br>Max width | Minimum, median and maximum width of the object |
| Speed (m/s) | Min speed<br>Median speed<br>Max speed | Minimum, median and maximum speed of the object |
| Aspect ratio | Min aspect ratio<br>Median aspect ratio<br>Max aspect ratio | Minimum, median and maximum aspect ratio of the object |
| Color | First color<br>Second color<br>Third color | First, second and third HSV color value |
| Area size | Min area<br>Median area<br>Max area | Minimum, median and maximum size of the area |

FIG. 14

| Input Scenes | Estimated and Corrected Camera Parameters | Scenes with A | Number of Appearances |
|---|---|---|---|
| 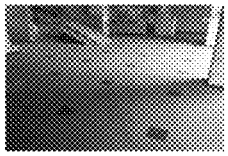 <Scene_1> | $f = 613$<br>$\theta = -111°$<br>$\rho = 182°$<br>$h_c = 2660$ mm | 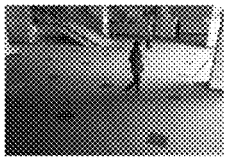 | 25 |
| 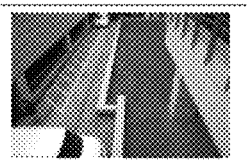 <Scene_2> | $f = 632$<br>$\theta = -118°$<br>$\rho = 180°$<br>$h_c = 6450$ mm | 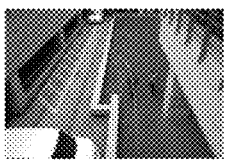 | 9 |
|  <Scene_3> | $f = 643$<br>$\theta = -104°$<br>$\rho = 180°$<br>$h_c = 3096$ mm |  | 2 |
| 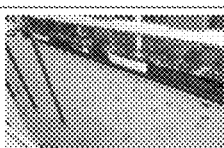 <Scene_4> | $f = 667$<br>$\theta = -117°$<br>$\rho = 173°$<br>$h_c = 10,331$ mm | 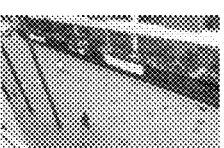 | 3 |
|  <Scene_5> | $f = 644$<br>$\theta = -107°$<br>$\rho = 183°$<br>$h_c = 2399$ mm | 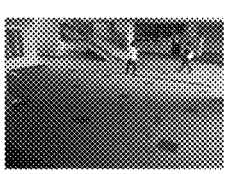 | 15 |
|  <Scene_6> | $f = 688$<br>$\theta = -108°$<br>$\rho = 179°$<br>$h_c = 2672$ mm |  | 10 |
| 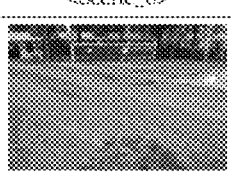 <Scene_7> | $f = 532$<br>$\theta = -109°$<br>$\rho = 180°$<br>$h_c = 3035$ mm |  | 3 |

FIG. 17

|        | Red | Green | Blue | Yellow | Orange | Purple | Pink | White | Gray | Black | Total Object |
|--------|-----|-------|------|--------|--------|--------|------|-------|------|-------|--------------|
| Red    | 112 | 0     | 0    | 0      | 2      | 0      | 4    | 0     | 0    | 0     | 129 (95%)    |
| Green  | 0   | 6     | 1    | 0      | 0      | 0      | 0    | 0     | 0    | 0     | 7 (86%)      |
| Blue   | 0   | 1     | 96   | 0      | 0      | 0      | 0    | 0     | 4    | 3     | 104 (92%)    |
| Yellow | 0   | 0     | 0    | 7      | 0      | 0      | 0    | 1     | 0    | 0     | 8 (88%)      |
| Orange | 2   | 0     | 0    | 3      | 88     | 0      | 0    | 1     | 0    | 0     | 94 (94%)     |
| Purple | 0   | 0     | 0    | 0      | 0      | 2      | 0    | 0     | 0    | 0     | 2 (100%)     |
| Pink   | 1   | 0     | 0    | 0      | 1      | 0      | 12   | 0     | 0    | 0     | 14 (86%)     |
| White  | 0   | 0     | 0    | 0      | 0      | 0      | 0    | 79    | 5    | 0     | 84 (94%)     |
| Gray   | 0   | 0     | 0    | 0      | 0      | 0      | 0    | 1     | 93   | 2     | 96 (97%)     |
| Black  | 0   | 0     | 4    | 0      | 0      | 0      | 0    | 0     | 23   | 1237  | 129 (98%)    |

| Focal length | 931 |
|---|---|
| Tilt angle | -115 |
| Roll angle | 183 |
| Camera height | 6.1m |
| True camera height | 6.5m |

| Focal length | 765 |
| Tilt angle | -111 |
| Roll angle | 179 |
| Camera height | 3.9m |
| True camera height | 4.1m |

| Focal length | 568 |
| Tilt angle | -116 |
| Roll angle | 179 |
| Camera height | 2.5m |
| True camera height | 2.6m |

| Focal length | 805 |
| Tilt angle | -117 |
| Roll angle | 177 |
| Camera height | 6.0m |
| True camera height | 6.2m |

| Focal length | 649 |
| --- | --- |
| Tilt angle | -124 |
| Roll angle | 181 |
| Camera height | 7.2m |
| True camera height | 7.2m |

| Focal length | 831 |
| --- | --- |
| Tilt angle | -104 |
| Roll angle | 182 |
| Camera height | 2m |
| True camera height | 2.2m |

| Focal length | 1836 |
| --- | --- |
| Tilt angle | -99 |
| Roll angle | 180 |
| Camera height | 2.7m |
| True camera height | 2.8m |

FIG. 21

|        | Small | Medium | Large | Total Object |
|--------|-------|--------|-------|--------------|
| Small  | 35    | 11     | 3     | 49 (71%)     |
| Medium | 6     | 185    | 21    | 212 (87%)    |
| Large  | 0     | 17     | 993   | 1010 (98%)   |

FIG. 23

|  | Horizontal | Normal | Vertical | Total Object |
|---|---|---|---|---|
| Horizontal | 38 | 3 | 5 | 46 (83%) |
| Normal | 1 | 54 | 7 | 62 (87%) |
| Vertical | 2 | 21 | 1140 | 1163 (98%) |

FIG. 25

|        | Slow | Normal | Fast | Total Object |
|--------|------|--------|------|--------------|
| Slow   | 96   | 37     | 0    | 133 (72%)    |
| Normal | 2    | 976    | 5    | 983 (99%)    |
| Fast   | 0    | 9      | 146  | 155 (94%)    |

NORMALIZED METADATA GENERATION DEVICE, OBJECT OCCLUSION DETECTION DEVICE AND METHOD

CROSS REFERENCE TO RELATED APPLICATIONS

This present application is a national stage filing under 35 U.S.C § 371 of PCT application number PCT/KR2017/002459 filed on Mar. 7, 2017 which is based upon and claims the benefit of priority to Korean Patent Application Nos. 10-2016-0124768 and 10-2016-0133474 filed on Sep. 28, 2016 and Oct. 14, 2016, respectively, in the Korean Intellectual Property Office. The disclosures of the above-listed applications are hereby incorporated by reference herein in their entirety.

TECHNICAL FIELD

The present invention relates to a normalized metadata generation device and method, and an object occlusion detection device and method capable of detecting an occluded state of an object through image analysis.

BACKGROUND ART

A multi-camera based video surveillance system produces huge amounts of data every day. In order to detect meaningful information from the huge amounts of data, the normalized metadata should be extracted to recognize and track an object of interest obtained by multiple cameras including different types of cameras.

As conventional technique, there have been proposed a real-time video retrieval system using video parsing, metadata descriptor and corresponding query mechanism, an object-based image indexing and detection system based on object feature similarity using motion segmentation, and a video retrieval system for semantic-based surveillance which tracks clusters under hierarchical framework. Such an image retrieval system for semantic-based surveillance uses a variety of queries such as keyword-based, multi-object and sketch-based queries.

Also, as conventional technique, there have been proposed a technique for combining recognized video contents with visual words to index and retrieve surveillance video, a multiple trajectory indexing and retrieval system using multiple linear algebraic structure in a reduced dimensional space, a robust retrieval and fast retrieval methods based on time-space graphs, subgraph indexing and Hadoop implementation, a presence indexing algorithm in a tight scene using face level information, a technique for detecting and tracking a plurality of pedestrians using a sociological model to generate trajectory data for video feature indexing, a visual surveillance briefing system based on event features such as object appearance and motion patterns, an autonomous video retrieval system for detecting features of pedestrians in various scenes based on human behavior and appearance, and a technique for searching for a desired object using a trajectory and a shape in an input video.

A common challenge with such conventional video indexing and retrieval methods is to summarize rare events from many data sets generated using multiple cameras including various types of cameras. However, the lack of normalized object information during retrieval has a problem of preventing accurate recognition of the same object obtained from another viewpoint.

In addition, since it is impossible to monitor an individual by monitoring video of the multi-camera based surveillance system, an efficient technique for recognizing important situations by retrieving metadata of an object of interest is required. In other words, in the multi-camera based surveillance system, an object detected by the cameras has different shapes, and therefore, a technology capable of efficiently detecting the object of interest in a wide range is required.

On the other hand, depth information of the object is used for object occlusion detection. A conventional depth estimation method utilizes the parallax of two or more cameras or an additional sensor for depth estimation such as an infrared sensor.

However, there is a problem that the cost is increased due to additional equipment and restriction is caused due to environment. To compensate for this, depth estimation and occlusion detection techniques in which a multiple color-filter aperture is mounted on a single camera have been proposed, but depth estimation and occlusion detection techniques using the multi-color filter apertures require a special aperture. In addition, there occurs problem that color distortion occurs at the boundary of an object on the out-focus, which requires additional distortion correction processing.

DISCLOSURE

Technical Problem

An object of the present invention is to provide a normalized metadata generation device and method, which accurately detect an object of interest from various videos obtained by various types of cameras of a multi-camera based image surveillance system for searching for an object of interest in a wide range, and extract normalized metadata of the detected object of interest.

Another object of the present invention is to provide an object occlusion detection device and method capable of detect an occluded state of an object by automatic camera calibration through video analysis without additional equipment or sensor.

Still another object of the present invention is to provide an object occlusion detection device and method capable of accurately tracking and recognizing an object more accurately than the prior art, by applying the same to an existing surveillance camera without additional cost.

Technical Solution

According to an aspect of the present invention, a normalized metadata generation method, which is to be performed by a metadata generation device of a multi-camera based video surveillance system including different kinds of cameras is disclosed.

A metadata generation method according to an embodiment of the present invention includes generating a multi-ellipsoid based three-dimensional (3D) human model using perspective features of a plurality of two-dimensional (2D) images obtained by the multiple cameras, performing scene calibration based on the three-dimensional human model to normalize object information of the object included in the two-dimensional images, and generating normalized metadata of the object from the two-dimensional images on which the scene calibration is performed.

The generating of the three-dimensional human model may generate a human model having a height from a foot position using three ellipsoids including a head, a body, and a leg in 3D world coordinates.

The ellipsoid may be back-projected onto a two-dimensional space to match an actual object to perform shape matching.

A moving object region may be detected by background modeling using a Gaussian mixture model (GMM) and a detected shape is normalized, to perform the shape matching.

The normalized shape may be calculated as a set of boundary points and each of the boundary points may be generated at a position where a radial line from a center of gravity meets an outermost boundary of the object.

The performing of the scene calibration may include extracting valid data for line segments from the foot to the head, estimating homology from the foot to the head using the extracted valid data, and detecting a vanishing line and a vanishing point from the homology.

The valid data may be selected according to a first condition that the line segment from the foot to the head is within a restricted region with respect to a y-axis and a second condition that the line segment from the foot to the head is a major axis of an ellipse to be approximated to a human object.

An angle, a major axis and a minor axis of the object may be calculated through matching operation between the object and the ellipsoid to acquire the valid data.

Invalid data may be removed from the extracted valid data using robust random sample consensus (RANSAC) to prevent error due to the homology from the foot to the head The vanishing line and the vanishing points may be determined by three human positions which are not on the same line.

The vanishing line and the vanishing points may be determined by three human positions which are not on the same line.

The vanishing points may be points under the ground plane, at which line segments from the foot to the head respectively representing positions of humans standing at various positions on the ground plane extend and meet each other.

The vanishing line may be a line segment connecting a first point and a second point, wherein the first point may be a point at which a straight line connecting head points of a first human position and a second human position and a straight line connecting foot points of the first human position and the second human meet each other, the second point may be a point at which a straight line connecting head points of the first human position and a third human position and a straight line connecting foot points of the first human position and the third human meet each other.

The homology from the foot to the head may be determined by calculating a projection matrix of a camera using the vanishing line, the vanishing points, and an object height.

The projection matrix may project an object on the two-dimensional image onto the three dimensional world coordinates which are not affected by camera parameters.

Internal parameters and external parameters of the camera may be estimated using the detected vanishing line and the vanishing points, and the internal parameters may include a focal length, a principal point and an aspect ratio, and the external parameters include a panning angle, a tilting angle, a rolling angle, a camera height with respect to the z-axis, transformation in x-axis and y-axis directions.

The generating of the normalized metadata of the object may include compensating colors of the two-dimensional image, extracting representative color information, extracting non-color metadata, and integrating the extracted metadata into one data model.

The compensating of the colors may include estimating a color of a light source by calculating a modified Minkowsky norm based color considering local correlation using the following equation and $$\left( \frac{\int (f^\sigma(x))^p dx}{\int dx} \right)^{1/p} = ke$$

where f(x) represents an image defined as an image $x=[x\ y]^T$, $f^\sigma=f*G^\sigma$, filtered by the Gaussian filter $G^\sigma$ and the Minkowsky norm p, compensating the estimated color of the light source using the following equation.

$$f_{corr}^c = f_c/\omega_c^3, \text{ force } c \in \{R,G,B\}$$

where $f_{corr}^c$ represents a color-corrected c-channel image, $f_c$ represents a c-channel image and $\omega_c$ represents a scaling parameter.

The extracting of the representative color information may include extracting the representative color information of the object by performing K-means clustering on the object region detected from the two-dimensional image of which the colors are compensated.

The non-color metadata may include size information including the height and width of the object, moving speed information of the object, aspect ratio information, and trajectory information.

The height ($H_o$) is calculated by the following equation.

$$H_O = \frac{(P_{2,1} - P_{3,1} \cdot y)X + (P_{2,2} - P_{3,2} \cdot y)Y + P_{2,2} - P_{3,2} \cdot y}{P_{3,3} \cdot y - P_{2,3}}$$

where P denotes the projection matrix, y denotes the y coordinate on the image plane.

The width ($W_o$) may be calculated by the following equation.

$$W_o = |X_o - X'_o| \cdot \omega_i$$

where $X_o$ represents a foot position on the three-dimensional world coordinates, $X'_o$ represents a foot position corresponding to one pixel-shifted foot position on the image plane, and $W_i$ represents a width of the object on the image plane.

The moving speed information ($S_o$) may be calculated by the following equation:

$$S_o = \sqrt{(X_o^t - X_o^{t'})^2 + (Y_o^t - Y_o^{t'})^2}$$

where $(X_o^t, Y_o^t)$ represents a position of the object on the world coordinates in a t-th frame, and $(X_o^{t'}, Y_o^{t'})$ represents a position of the object one second earlier.

The aspect ratio ($R_o$) information may be calculated by the following equation.

$$R_o = H_i/W_i$$

where $H_i$ and $W_i$ respectively represent the height and width of the object on the image plane.

The trajectory information ($T_o$) may be calculated using four positions on trajectory by the following equation.

$$T_o = [x_o^1, y_o^1, x_o^2, y_o^2, x_o^3, y_o^3, x_o^4, y_o^4]^T$$

where $[x_0\ y_0]^T$ is the start position, $[x_1\ y_2]^T$ is the 1/3 position, $[x_2\ y_2]^T$ is the 2/3 position, and $[x_4\ y_4]^T$ is the end position.

According to another aspect of the present invention, a normalized metadata generation device for a multi-camera-based video surveillance system including different kinds of cameras is disclosed.

The normalized metadata generation device includes a normalized metadata generation includes a memory configured to store instructions, and a processor configured to execute the instructions, wherein the instructions execute a normalized metadata generation method including, generating a multi-ellipsoid based three-dimensional (3D) human model using perspective features of a plurality of two-dimensional (2D) images obtained by the multiple cameras, performing a scene calibration based on the 3D human model to normalize object information of the object included in the 2D images, and generating normalized metadata of the object from the two-dimensional images on which the scene calibration is performed.

According to still another aspect of the present invention, an object occlusion detection method capable of detecting an occluded state of an object through camera automatic calibration through image analysis.

According to an embodiment of the present invention, there may be provided an object occlusion detection method including (a) inputting a current frame into a background model, extracting an object region using the background model, and detecting a vanishing point and a vanishing line using the extracted object region, (b) calibrating camera parameters using the vanishing point and the vanishing line, (c) estimating a depth of an object by inversely projecting positions of a part of the object onto a ground plane in a 3D space using a result of calibration of the camera parameters, (d) estimating a variation in the depth of the object using the estimated depth of the object and a depth of the object estimated in a previous frame, and (e) detecting occlusion of the object in the current frame using the variation in the depth of the object.

The step (a) may include detecting a foot position and a head position of the object region, and detecting the vanishing point and the vanishing line at least one of a parallel line connecting the detected foot position the head position and background line information.

The step (a) may include selecting, as the vanishing point, at least three intersection points intersecting the background line information when a number of the detected foot positions and head positions is smaller than a reference number, detecting at least one vertical vanishing point of the selected vanishing points, and detecting a line connecting remaining vanishing points of the selected vanishing points as a horizontal vanishing line.

The step (a) may include detecting a vertical vanishing point using the foot positions and the head positions of the object when the number of the detected foot positions and head positions is greater than a reference number and the object linearly moves, and detecting a horizontal vanishing line using the background line information.

The step (a) may include detecting a vertical vanishing point using a line connecting the foot position and the head position when the number of the detected foot positions and head positions is greater than a reference number and the object does not move linearly, and determining a horizontal vanishing point using a line connecting the detected foot positions and a line connecting the head positions and detecting a horizontal vanishing line by connecting the determined horizontal vanishing points.

The step (b) may include calibrating camera parameters using the vanishing point and the vanishing line based on the following equation.

$$f = \sqrt{(a_3/a_2 - p_y)(v_y - p_y)}$$

$$\rho = \operatorname{atan}(-v_x/v_y)$$

$$\theta = \operatorname{atan}\left(-\sqrt{v_x^2 + v_y^2}\big/f\right)$$

$$h_c = h_o \bigg/ \left(1 - \frac{d(o_h, v_l)\|o_f - v\|}{d(o_f, v_l)\|o_h - v\|}\right)$$

Where f denotes the focal length, $\rho$ denotes the roll angle, $\theta$ denotes the tilt angle, $h_c$ denotes the camera height, $v_l$ denotes the horizontal vanishing line, $v=[v_x\ v_x]^T$ denotes the vertical vanishing point, $h_o$ denotes the object height, $o_f$ denotes the foot position of the object, $o_h$ denotes the head position of the object, and d(A,B) denotes the distance between position A and position B.

The step (c) may include inversely projecting the foot position of the object onto the reference plane in the 3D space to estimate the depth of the object.

According to still another aspect of the present invention, an object occlusion detection device capable of detecting an occluded state of an object through camera automatic calibration through image analysis.

According to an embodiment of the present invention, there may be an object occlusion detection device including a camera calibration unit that inputs a current frame to a background model, extracts an object region using the background model, detects a vanishing point and a vanishing line using the extracted object region and calibrates camera parameters using the vanishing point and the vanishing line, a depth estimation unit that inversely projects positions of a part of the object onto a ground plane in a 3D space using a result of calibration of the camera parameters and estimate a depth of an object, and a detection unit that calculates a variation in the depth of the object using the estimated depth of the object and a depth of the object estimated in a previous frame and detects occlusion of the object in the current frame using the variation in the depth of the object.

The camera parameter calibration unit may detect a foot position and a head position of the object region, detect the vanishing point and the vanishing line using at least one of a parallel line connecting the detected foot position and the head position and background line information, and calibrate the camera parameters using the vanishing point and the vanishing line.

Advantageous Effects

According to the embodiments of the present invention, the normalized metadata generation device and method accurately detects an object of interest from various images obtained by various kinds of cameras of a multi camera based video surveillance system for searching an object of interest in a wide range The extracted normalized metadata of the object of interest can be extracted, and no special pattern or depth measurement is required for camera calibration.

Also, by providing the object occlusion detection device and method according to an embodiment of the present invention, an occluded state of an object can be detected through automatic camera calibration through image analysis without additional equipment or a sensor.

In addition, the present invention is advantageous in that object tracking and object recognition can be performed more accurately than conventional methods by applying the present invention to an existing surveillance camera without additional cost.

DESCRIPTION OF DRAWINGS

FIGS. 2 to 13 are diagrams for describing a normalized metadata generation method according to an embodiment of the present invention;

FIGS. 14 to 28 are diagrams showing experimental results for a normalized metadata generation method according to an embodiment of the present invention;

MODE FOR INVENTION

As used herein, the singular forms are intended to include the plural forms as well, unless the context clearly indicates otherwise. It will be further understood that the terms "comprises" and/or "comprising", or "includes" and/or "including", when used in this specification, specify the presence of stated elements and/or steps, but do not preclude the presence or addition of one or more other elements and/or steps thereof. The terms "part," "module," "device" or the like used in the specification means a unit of processing at least one function or operation and may be implemented by hardware or software or a combination of hardware and software.

Hereinafter, various embodiments of the present invention will be described with reference to the accompanying drawings.

Figure 1:
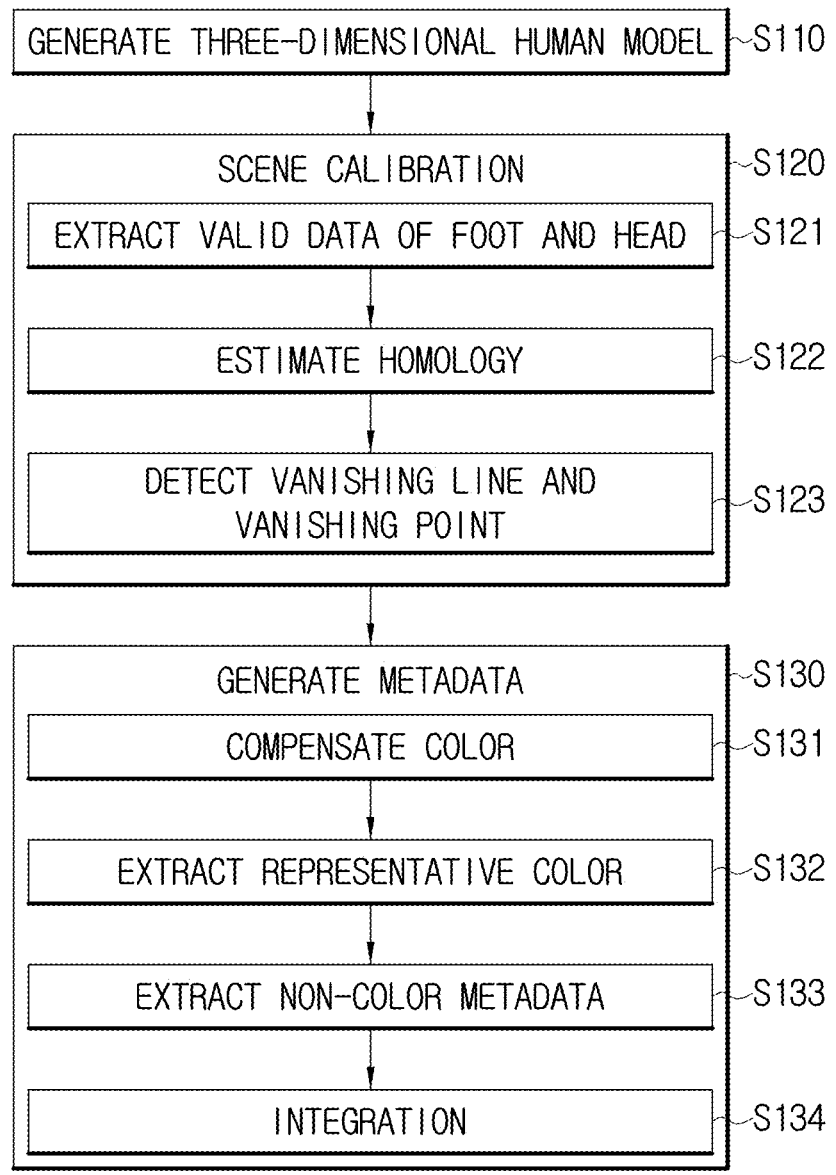
FIG. 1 is a flowchart of a normalized metadata generation method according to an embodiment of the present invention.

FIG. 1 is a flowchart of a normalized metadata generation method according to an embodiment of the present invention, and FIGS. 2 to 13 are diagrams for describing a normalized metadata generation method according to an embodiment of the present invention. A normalized metadata generation method according to an embodiment of the present invention is described with reference to FIG. 1 and FIGS. 2 to 13.

In step S110, the metadata generation device generates a three-dimensional human model.

A multi-camera based video surveillance system should be able to retrieve the same objects from multiple scenes generated by different cameras using appropriate queries. However, non-normalized object information causes a search error. In order to normalize the object information, camera parameters are estimated using automatic scene calibration, and a projection matrix is estimated using the camera parameters obtained by scene calibration. After the normalized object information is obtained, the object in the two-dimensional image is projected onto the three-dimensional world coordinate using the projection matrix. Conventional camera calibration methods use a special calibration pattern in common. This calibration pattern extracts feature points from a planar pattern board and estimates camera parameters using a closed-form solution. However, this particular calibration pattern-based algorithm has limitations because manual calibration of multiple cameras at the same time is impractical and imprecise. In order to solve this problem, a multi-ellipsoid based three-dimensional human model using perspective characteristics of a two-dimensional image is used in the present invention.

When it is assumed that $X_f=[X_f Y_f 1]^T$ is a foot position in a ground plane, and $x_f=[x_f y_f 1]^T$ is a corresponding foot position in the image plane of all homogeneous coordinates, $x_f$ and $X_f$ may be calculated using homography as follows.

$$x_f = H^{-1} x_f \qquad \text{[Equation 1]}$$

Where $H=[p_1 p_2 p_3]^T$ is a 3×3 homography matrix, $p_i$ (i=1, 2, 3) is the first three columns of a 3×4 projection matrix P calculated by estimating the camera parameters.

Then, a human model having a height h from the foot position is generated using a three-dimensional ellipsoid including the head $Q_h$, the body $Q_t$, and the leg $Q_l$ in the 3D world coordinates. The 4×4 matrix of the ellipsoid is defined as follows:

$$Q_k = \begin{bmatrix} \frac{1}{R_X^2} & 0 & 0 & -\frac{X_c}{R_X^2} \\ 0 & \frac{1}{R_Y^2} & 0 & -\frac{Y_c}{R_Y^2} \\ 0 & 0 & \frac{1}{R_Z^2} & -\frac{Z_c}{R_Z^2} \\ -\frac{X_c}{R_X^2} & -\frac{Y_c}{R_Y^2} & -\frac{Z_c}{R_Z^2} & \frac{X_c^2}{R_X^2}+\frac{Y_c^2}{R_Y^2}+\frac{Z_c^2}{R_Z^2} \end{bmatrix} \qquad \text{[Equation 2]}$$

Where $Q_k(k \in \{h, t, l\})$ represents the ellipsoid matrix of the head, the body, and the leg, respectively. $R_X$, $R_Y$ and $R_Z$ represent the ellipsoidal radii for the X, Y and Z coordinates and a center of the ellipsoid ($[X_c Y_c Z_c]^T$).

For example, the average heights for a child, a juvenile, and an adult was set to 100 cm, 140 cm, and 180 cm, respectively for application to real human models. The ratio of head, body and leg is set to 2:4:4.

Figure 2:
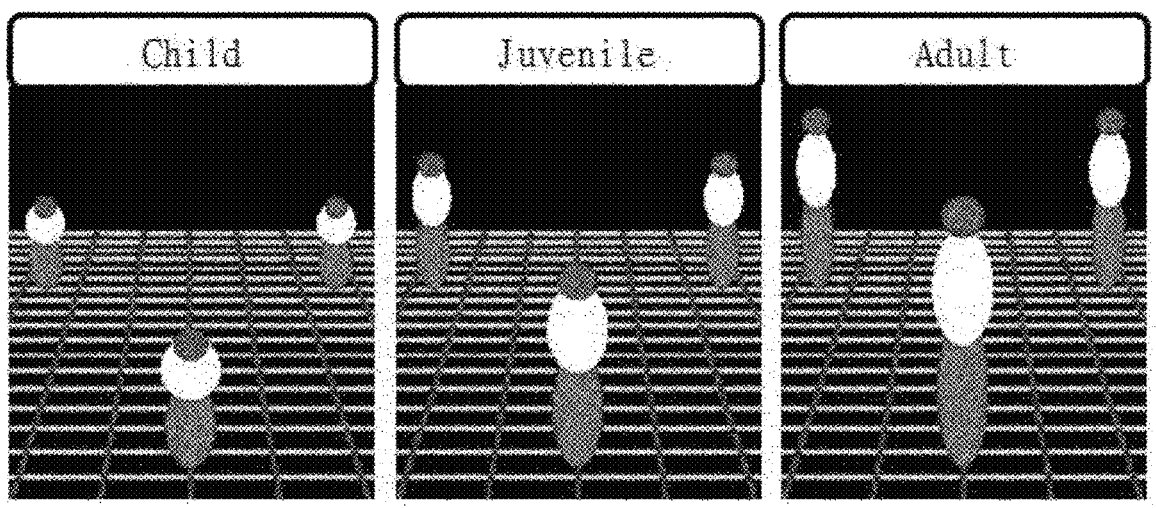
Figure 3A:
Figure 3B:
Figure 3C:
Figure 3D:

Each ellipsoid is back-projected to match an actual object in a two-dimensional space. The 3×3 ellipsoid back-projected is defined as $C_k$ by the projection matrix P.

$$C_k^{-1} = P Q_K^{-1} P^T \qquad \text{[Equation 3]}$$

where C represents an ellipsoid matrix such as $u^TCu=0$. FIG. 2 shows the results of several ellipsoids back-projected at different positions. In FIG. 2, three different ellipsoids in each dotted box have the same height.

A multi-ellipsoid-based human model is generated according to the position and height of an object from multiple cameras. The first step in generating a human model is to perform shape matching in an image. In the embodiment of the present invention, in order to match shapes, a moving object region is detected by background modeling using a Gaussian mixture model (GMM), and the detected shapes are normalized. Since the concrete shapes differs from each other depending on the position and size of the object, the normalized shape is represented by a set of boundary points. More specifically, each boundary point is created at a position where a radial line from the center of gravity meets the outermost boundary of the object. Assuming that the angle between adjacent radial lines is θ, the number of boundary points becomes N=360°/θ. The corresponding human model corresponding to the shape of the object may be defined as follows.

$$B=[j_1 j_2 \ldots j_N], \text{ and } M_i=[o_1^i o_2^i \ldots o_N^i] \quad \text{[Equation 4]}$$

Where B denotes the type of the object, $i \in$ {child, juvenile, and adult}, $M_i$ is the form of the human model, and N is the number of the normalized form. For example, when θ=5°, N=72 is resulted.

The matching error between B and $M_i$ is defined as follows:

$$e_i = \sum_{l=1}^{N} (j_l - o_l^j)^2 \quad \text{[Equation 5]}$$

As a result, an ellipsoid-based human model with the minimum matching error $e_i$ is selected for three human models including a child, a juvenile, and an adult. When the matching error is greater than the threshold $T_e$, the object is classified as non-human. Thus, when the threshold $T_e$ is very large, a non-human object may be classified as human. On the other hand, when the threshold $T_e$ is very small, human detection may fail. For this reason, $T_e$=8 was chosen experimentally for best human detection performance. The result of shape matching of the ellipsoid-based human models may be displayed in conformity with actual objects as shown in FIGS. 3A-3D. In this case, moving pedestrians are detected and matched by ellipsoid-based human models. Ellipsoid-based matching fails when a moving object is detected incorrectly. However, some of the exact matching results may compensate for rare failures.

Referring again to FIG. 1, in step S120, the metadata generation device performs scene Calibration based on the generated 3D human model.

Cameras with different inner and outer parameters produce different sizes and velocities in the two-dimensional image plane for the same object in three-dimensional space. To recognize the same object in the multi-camera based video surveillance system, detection and tracking need to be performed in 3D world coordinates that are not affected by camera parameters. The normalized physical information of an object may be extracted in two steps. The first step is automatic scene calibration for estimating a projection matrix of the camera, and the second step is object projection to the world coordinates using a projection matrix. An automatic scene calibration method according to an embodiment of the present invention assumes that a foot-to-head line of a human object is perpendicular to the xy plane in the world coordinates and parallel to the z-axis.

The automatic scene calibration method according to the embodiment of the present invention is composed of three steps as shown in FIG. 1. Step 1 (step S121) is to extract valid foot and head data to calculate homology from foot to head, step 2 (step S122) is to estimate homology using the valid data from foot to head, and step 3 (step S123) is to calibrate the camera by detecting a vanishing line and vanishing points by using the homology from foot to head.

Hereinafter, the homology from the foot to the head will be described.

Figure 4:
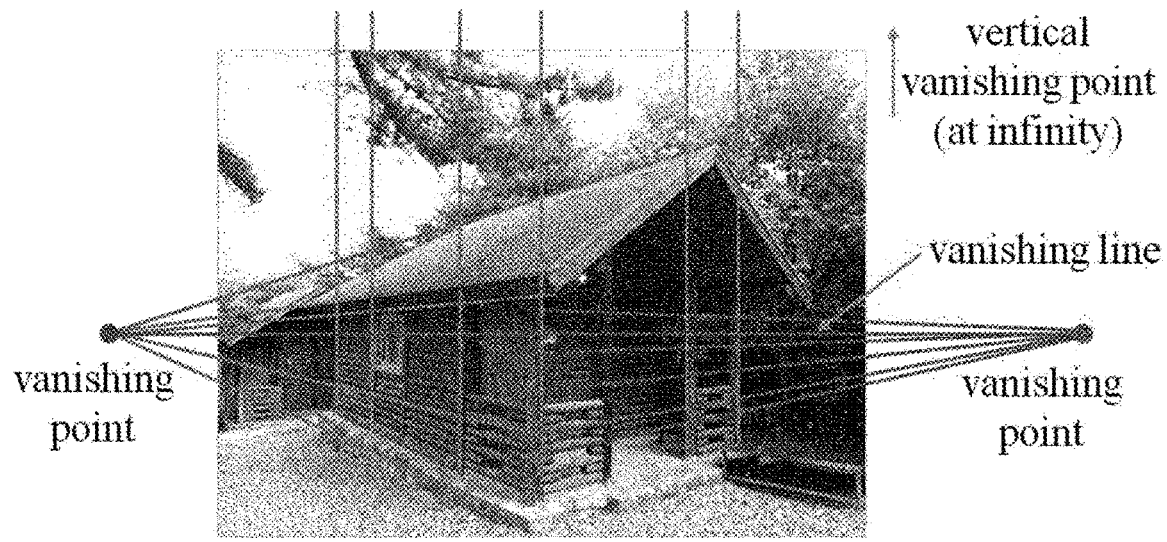

In Euclidean geometry, two parallel lines do not meet anywhere. On the other hand, in projective geometry, two parallel lines meet at a point called a vanishing point. A line connecting the two vanishing points is called a vanishing line, as shown in FIG. 4.

Figure 5:
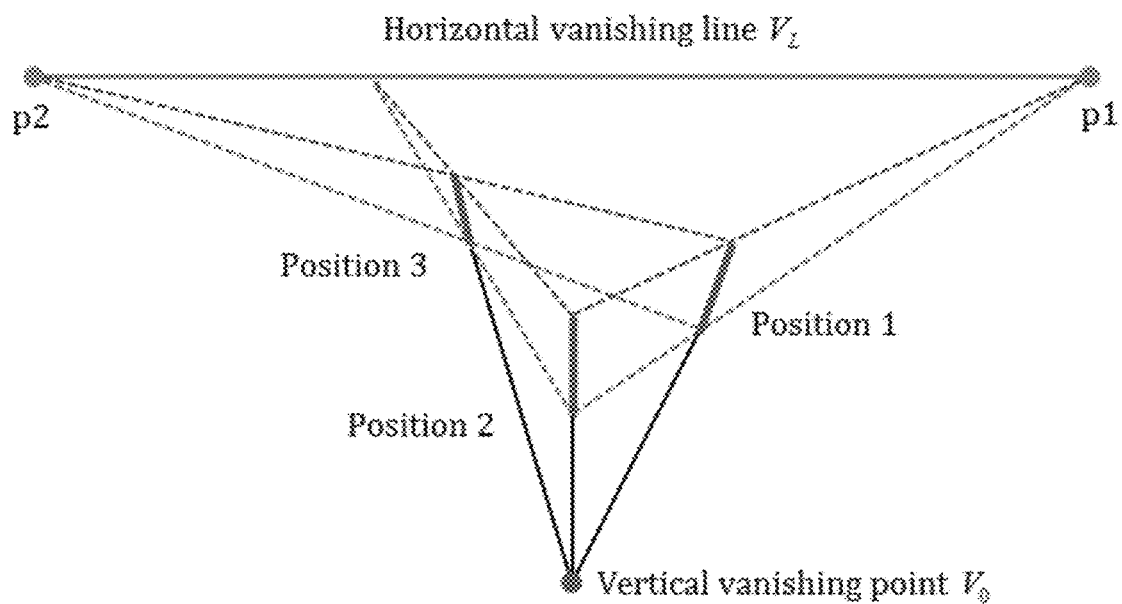

Conventional single image based methods for estimating vanishing points and vanishing lines often fail to estimate vanishing points and vanishing lines when there is no line segment component in a background image. In order to overcome the limitation of the background generation based method, a foreground object based vanishing point detection method has recently been proposed. Since a camera of a general video surveillance system is installed at a position at which a point of looking at an object is higher than the ground plane, the lines from the foot to the head of a standing person at various positions of the ground plane corresponding to the XY plane meet at one point on the ground plane as shown in FIG. 5. Here, each position of a person is represented by a line segment connecting between the bottom foot and the top head. When the line segments from the foot to the head are extended, they meet at a vertical vanishing point $V_o$ under the ground plane. In FIG. 5, a straight line connecting the head points of Positions 1 and 2 meets another straight line connecting the foot points of the same Positions at p1. Similarly, p2 is determined by Positions 1 and 3. Thus, three human positions, which are not on the same line, determine the horizontal vanishing line VL and the vertical vanishing point $V_o$.

The vanishing line and the vanishing point are used to estimate the projection matrix of a camera. More specifically, assuming that $\overline{X}=[X\ Y\ Z\ 1]^T$ is a point in the uniform world coordinates, its projection transformation becomes $\overline{x}=P\overline{X}$ Here, P is a projection matrix. When $\overline{x}=[\overline{x}\ \overline{y}\ z\ 1]^T$ is given, corresponding points in the image plane are determined to be $x=\overline{x}/z$ and $y=\overline{y}/z$. Since the XY plane is assumed to be a ground plane, a foot position in the world coordinates is $X_f=[X\ Y\ 0]^T$ and the projected foot position is $\overline{x}_f=H_f\overline{X}_f$. Here, $\overline{X}_f=[X\ Y\ Z\ 1]^T$. $\overline{x}_h=H_h\overline{X}_h$ may be calculated by the same method as a method of moving the XY plane to a head plane. Here, $H_f$ and $H_h$ are 3×3 matrices. Since the head position is projected onto the corresponding foot position, $\overline{X}_f=\overline{X}_h$ and it may be expressed as:

$$\overline{x}_h = H_{hf}\overline{x}_f$$

$$\overline{x}_f = H_{fh}\overline{x}_h \quad \text{[Equation 6]}$$

Where $H_{hf}=H_h H_f^{-1}$ and $H_{fh}=H_f H_h^{-1}$ both are 3×3 matrixes and $H_{hf}=H_{fh}^{-1}$ is resulted.

When the foot position coordinates on the ground plane are given, the corresponding head position in the image plane be may determined using $H_{hf}$. $H=H_{fh}$ is defined as the homology from foot to head and may be determined by calculating the projection matrix P using the vanishing point, the vanishing line, and an object height Z.

As described above, step S120 of performing automatic scene calibration includes step S121 of extracting valid data of foot and head, step S122 of estimating a homology from foot to head using the extracted valid data, and step S123 of detecting the vanishing line and the vanishing point. A human model is detected using a Gaussian mixture model. The detected object region is subjected to a morphology operation for noise-free labeling. Valid candidate data for the foot and head of the labeled object are selected under two conditions. The first condition is that a line segment from the foot to the head is within a restricted region with respect to the y-axis and the second condition is that the line segment from the foot to the head is the major axis of an ellipse to be approximated to the human object.

To obtain the angle and major and minor axes of the labeled human object, an ellipsoid matching operation is performed. More specifically, the object shape is defined by an outer boundary, as follows.

$$s = [s_1 s_2 \ldots s_N]^T \qquad \text{[Equation 7]}$$

Where $s_i = [x_i y_i]^T$ (i=1, ..., N) denotes an i-th boundary point, and N is the total number of boundary points. An angle of the shape S is calculated using second moments as follow:

$$\theta = \frac{1}{2} \arctan\left(\frac{2\mu_{1,1}}{\mu_{2,0} - \mu_{0,2}}\right) \qquad \text{[Equation 8]}$$

where $\mu$ and $x_c$ may be calculated using the following equation:

$$\mu_{p,q} = \sum_{i=1}^{N} (x_i - x_c)^p (y_i - y_c)^q \qquad \text{[Equation 9]}$$

$$x_c = \frac{1}{N} \sum_{i=1}^{N} x_i, \text{ and } y_c = \frac{1}{N} \sum_{i=1}^{N} y_i \qquad \text{[Equation 10]}$$

In order to calculate the major and minor axes of the ellipsoid, the minimum and maximum inertial moments are first defined respectively as follows:

$$I_{min} = \sum_{i=1}^{N} \{(x_i - x_c)\cos\theta - (y_i - y_c)\sin\theta\} \qquad \text{[Equation 11]}$$

$$I_{max} = \sum_{i=1}^{N} \{(x_i - x_c)\sin\theta - (y_i - y_c)\cos\theta\}$$

The major and minor axes are determined using $I_{min}$ and $I_{max}$ as follows:

$$A_l = \left(\frac{4}{\pi}\right)^{1/4} \left(\frac{I_{max}^3}{I_{min}}\right)^{1/8}, \text{ and } A_s = \left(\frac{4}{\pi}\right)^{1/4} \left(\frac{I_{min}^3}{I_{max}}\right)^{1/8} \qquad \text{[Equation 12]}$$

The aspect ratio of the object is defined as $r = A_l/A_s$ and candidate foot and head vectors is defined as $c = [x_f y_f x_h y_h]^T$. "c" is calculated using $\theta$ according to the following equation:

$$x_f = (y_{max} - y_c)\frac{\cos\theta}{\sin\theta} + x_c, \text{ and } y_f = y_{max} \qquad \text{[Equation 13]}$$

$$x_h = (y_{min} - y_c)\frac{\cos\theta}{\sin\theta} + x_c, \text{ and } y_h = y_{min}$$

where $y_{max}$ and $y_{min}$ represent the maximum and minimum of $y_i$ (i=1, ..., N), respectively.

A set of valid candidate data $C = [c_1 c_2 \ldots c_L]^T$ is generated from $c_1$ satisfying the following four conditions.

condition 1: $r_1 < r < r_2$ condition 2: $\theta_1 < \theta < \theta_2$ condition 3: There are $s_i$ of which a distance from $(x_f, y_f)$ is less than $d_1$, and $s_j$ of which distance from $(x_h, y_h)$ is less than $d_1$.

condition 4: There is no pair of $c_i$ with a mutual distance less than $d_2$.

In order to derive the best experimental results, in the first condition, $r_1=2$ and $r_2=5$ are set, and in the second condition $\theta_1=80°$ and $\theta_2=100°$. In the third and fourth conditions, $d_1=3$ and $d_2=10$ are set.

Since valid candidate data C still contains invalid data, a direct computation of homology H from foot to head may cause significant errors. To solve this problem, invalid data is removed from C using robust random sample consensus (RANSAC). Since H has a degree of freedom of 8, it is possible to perform determination using four pieces of valid data. Assuming a vector with eight components of the first row of H is $a = [h_{11} h_{12} h_{13} h_{21} h_{22} h_{23} h_{31} h_{32}]^T$, "a" may be determined using the following equation:

$$\begin{bmatrix} x_f & y_f & 1 & 0 & 0 & 0 & -x_f x_h & -y_f y_h \\ 0 & 0 & 0 & x_f & y_f & 1 & -x_f y_h & -y_f y_h \end{bmatrix} a = \begin{bmatrix} x_h \\ y_h \end{bmatrix} \qquad \text{[Equation 14]}$$

Since two linear forms given by a candidate vector are generated through Equation 14, "H" may be determined as four candidate vectors.

A head position of each candidate vector is estimated using H and determined by a corresponding foot position in order to see how much valid data supports the estimated "H". The estimated head position is compared with an actual head position, and the candidate vector is considered to support H when an error is sufficiently small. This process is repeated a given number of times, and the candidate vector that supports the optimal H becomes valid. Equation 14 is generated with the valid data. Generally, many valid data yields eight or more mathematical expressions, and the vector "a", which is equivalent to the matrix "H", is determined using pseudo inverse. Even through invalid data is generated by occlusion, grouping and non-human objects, the correct valid data may be estimated while the process is repeated and the candidate data is accumulated.

When given an estimated foot-to-head homology "H", two arbitrarily selected foot positions generate corresponding two head positions. Two line segments connecting two pairs of foot and head positions meet at the vanishing point. More specifically, in a three-dimensional world coordinate, a line segment may be represented using the vector $l = [a \ b \ c]^T$ and satisfies the following linear form:

$$ax + by + c = 0 \qquad \text{[Equation 15]}$$

where line segment coefficients {a, b, c} are determined using two points $p=[p_x \ p_y]^T$ and $q=[q_x \ q_y]^T$ as follows:

$a=p_y-q_y$ $b=P_x-q_x$ $c=(p_y-q_y)q_x+(p_x-q_x)q_y$ [Equation 16]

When the two line segments $l_1$ and $l_2$ meet at the vanishing point $V_o$, a relationship such as the following equation is satisfied.

$V_o=l_1 \times l_2$ [Equation 17]

To determine the vanishing line, three candidate vectors $\{c_1, c_2, c_3\}$ are needed.

The two line segments connecting the pairs of feet and head connecting $c_1$ and $c_2$ meet at one point. This one point is $r=[r_x \ r_y]^T$.

Figure 6A:
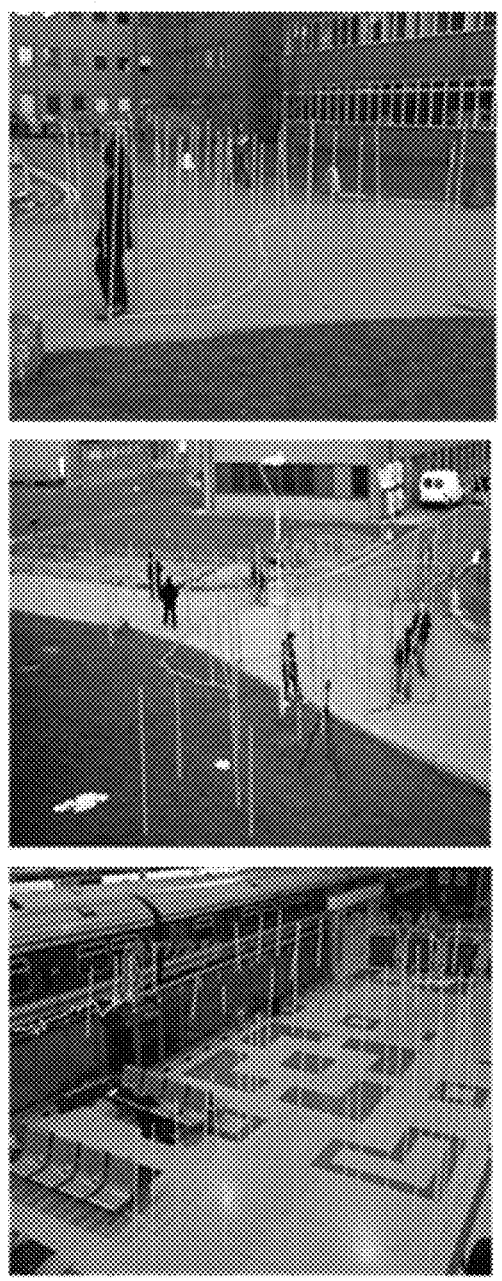
Figure 6B:
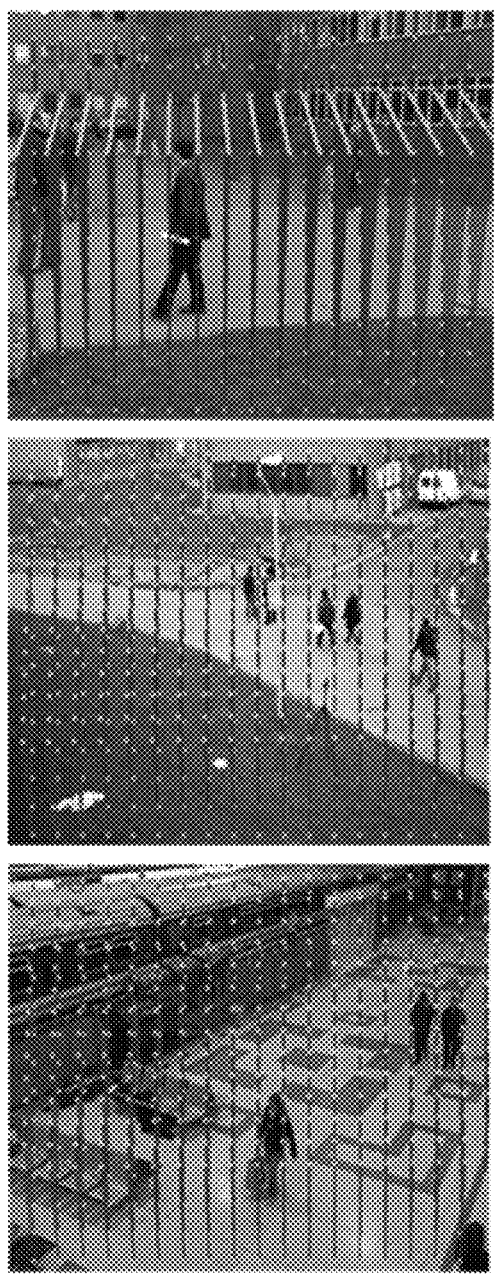
Figure 6C:
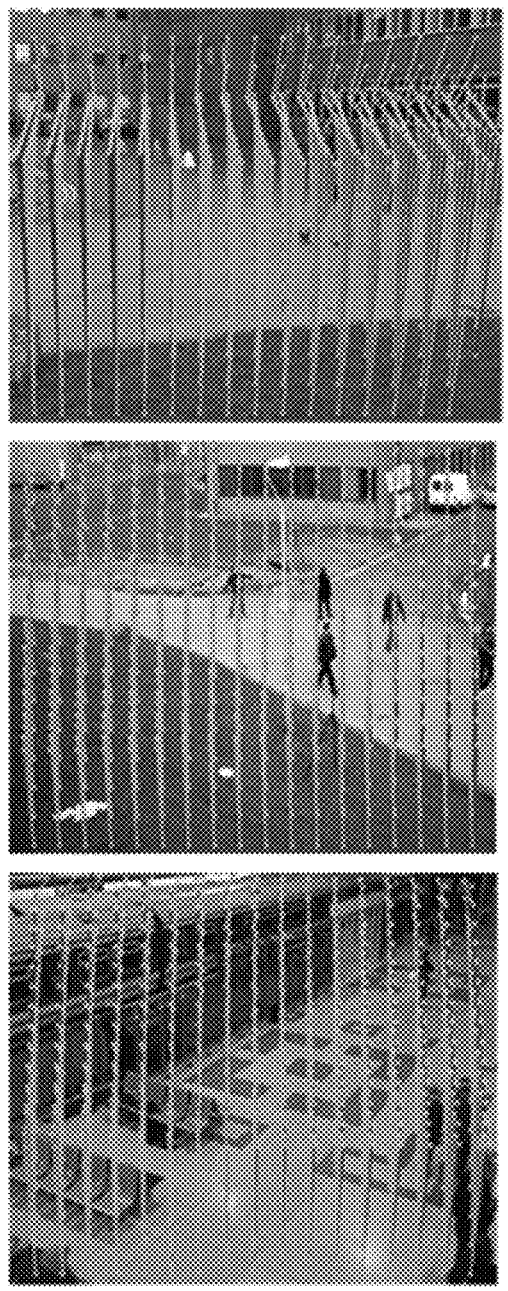

Similarly, another point $s=[s_x \ s_y]^T$ is determined using $c_2$ and $c_3$. The line connecting the two points r and s is the vanishing line $V_L$. Given $V_0$ and $V_L$, the camera parameters may be estimated as shown in FIGS. 6A-6C. That is, in FIG. 6A is valid data, FIG. 6B is actually-measured data of the homology, and FIG. 6C is the estimated homology.

Internal parameters include a focal length f, a principal point $[c_x \ c_y]^T$, and the aspect ratio "a". Assuming that the principal point is the same as the center of the image, a=1, and that there is no skew, the internal parameters of the camera may be briefly expressed as follows:

$$K = \begin{bmatrix} f & 0 & c_x \\ 0 & f & c_y \\ 0 & 0 & 1 \end{bmatrix}$$ [Equation 18]

The external parameters include a panning angle α, a tilting angle θ, a rolling angle ρ, a camera height for the z axis, and translation in the x and y axis directions. Assuming α=0, x=y=0, the camera projection matrix is obtained as the product of the internal and external parameter matrixes, as follows:

$$P = $$ [Equation 19]

$$K \begin{bmatrix} \cos\rho & -\sin\rho & 0 \\ \sin\rho & \cos\rho & 0 \\ 0 & 0 & 1 \end{bmatrix} \begin{bmatrix} 1 & 0 & 0 \\ 0 & \cos\rho & -\sin\rho \\ 0 & \sin\rho & \cos\rho \end{bmatrix} \begin{bmatrix} 1 & 0 & 0 & 0 \\ 0 & 1 & 0 & 0 \\ 0 & 0 & 1 & -h_c \end{bmatrix}$$

A vertical vanishing point for the z axis $V_0=[v_x \ v_y \ 1]^T$ provides, along with the point $[x \ y \ 1]^T$ at the horizontal vanishing line, the following constraints:

$$v_0^T \omega \begin{bmatrix} x \\ y \\ 1 \end{bmatrix} = 0$$ [Equation 20]

Here, $\omega = K^{-T}K^{-1}$ denotes an image of the absolute conic (IAC). Substituting the expression 18 into the expression 20, the following expression is calculated.

$$v_x x + \frac{v_y}{a^2} + f^2 = 0$$ [Equation 21]

This shows that the horizontal vanishing line may be determined by the vertical vanishing point and the focal length, and a rotation parameter may be calculated from $v_x$, $v_y$, f as follows.

$$\rho = \arctan\frac{-av_x}{v_y}, \text{ and } \theta = \arctan2\left(\sqrt{a^2v_x^2 + v_y^2} - af\right)$$ [Equation 22]

Where a=1.

According to the embodiment of the present invention, f, ρ, and θ may be calculated by estimating the vanishing line and the vanishing point using Equations 21 and 22. The camera height $h_c$ can be calculated using the height of an actual object in the world coordinates $h^w$, the vanishing line $V_L$, and the vanishing point $V_O$ using the following equation:

$$\frac{h^w}{h_c} = 1 - \frac{d(p_h, V_L)d(p_f, V_O)}{d(p_f, V_L)d(p_h, V_O)}$$ [Equation 23]

Where $p_f$ and $p_h$ represent positions of the foot and head of the i-th object respectively and d(a, b) represents a distance between points a and b. In the experiment, $h^w$=180 cm was used as the reference height.

Referring again to FIG. 1, in step S130, the metadata generation device generates metadata of an object. Step S130 of generating metadata includes step S131 of compensating colors of the input image, step S132 of extracting representative colors, step S133 of extracting non-color metadata, and step S134 of integrating the extracted metadata into one data model.

After performing object-based multi-camera calibration, the object's metadata needs to be extracted with a given query for normalized object indexing. In this task, the query of the object consists of representative colors in the HSV color space, horizontal and vertical meter sizes, a moving speed of meters per second, an aspect ratio, and a moving trajectory.

The color temperature of the object may vary for different cameras. In order to minimize this color change problem, the present embodiment of the present invention performs color constancy operation such as an initial processing step of compensating for white balance of extracted representative colors.

Assuming that the object is illuminated by one light source, the estimated color of the light source is as follows:

$$e = \begin{bmatrix} R_e \\ G_e \\ B_e \end{bmatrix} = \int_w e(\lambda)s(\lambda)c(\lambda)d\lambda$$ [Equation 24]

where e(λ) represents a light source, s(λ) represents a reflection ratio, $c=[R(\lambda) \ G(\lambda) \ B(\lambda)]^T$ represents a camera sensitivity function, and ω represents a wavelength spectrum including red, green, and blue.

A color compensation method according to an embodiment of the present invention is based on the shades of gray method. The input image is down-sampled to reduce computational complexity, and simple low pass filtering is performed to reduce noise effect. A modified Minkowsky norm based color considering local correlation may be given as:

$$\left(\frac{\int (f^\sigma(x))^p dx}{\int dx}\right)^{1/p} = ke \quad \text{[Equation 25]}$$

where f(x) represents an image defined as an image $x=[x\ y]^T$, $f^\sigma=f*G^\sigma$, filtered by the Gaussian filter $G^\sigma$ and the Minkowsky norm p. The p allows the weights between the measurements to be uniformly distributed, and vice versa. An appropriate choice of the p prevents the light source from being deflected into the detail color channel. In the experiment, p=6 was used to derive the best result for color compensation for multiple cameras. As a result, scaling parameters $\{\omega_R, \omega_G, \omega_B\}$ may be determined using colors of the estimated light source. Modified colors may be given as follows:

$$f_{corr}{}^c = f_c/\omega_c{}^3, \text{ for } c \in \{R, G, B\} \quad \text{[Equation 26]}$$

Figure 7A:
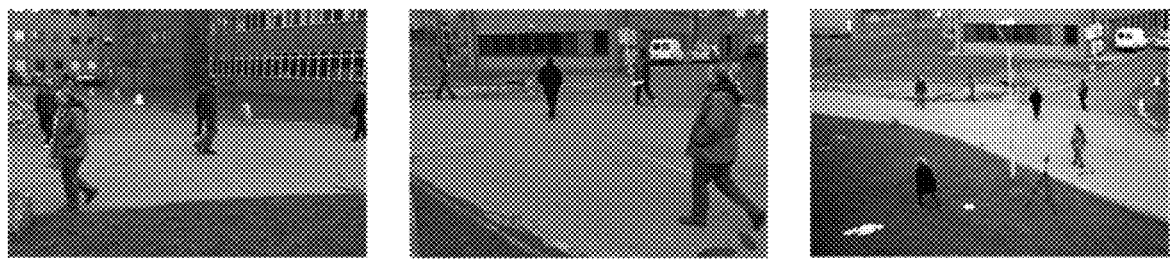
Figure 7B:

FIGS. 7A-7B show a result of color correlation using three different cameras. That is, FIG. 7A represents input images obtained by the three different cameras, and FIG. 7B represents a color correlation image using the shades of gray method. The color correlation estimates the normalized light source, thereby minimizing inter-frame color distortion.

In a representative color extraction method according to the embodiment of the present invention, a K-means transformed into the HSV color space to minimize the inter-channel clustering algorithm is used. The input RGB image is correlation, as follows.

$$H = \arctan\frac{\sqrt{3}(G-B)}{(R-G)+(R-B)}, \quad \text{[Equation 27]}$$

$$S = 1 - \frac{\min(R, G, B)}{V}, V = \frac{R+G+B}{3}$$

It is assumed that $j_n=[H_n\ S_n\ V_n]^T$ is an HSV color vector of an n-th (n=1, ..., N) pixel. In this case, N is the total number of pixels in the image. The initial K pixels are arbitrarily selected to generate a set of mean vectors $\{g_1, \ldots, g_K\}$. The $g_i$ (i=1, ..., K) represents a selected HSV color vector. For each color vector, when $j_n$ is very close to $g_i$, $j_n$ has label $J_i$ as follows:

$$J_i = \{j_n | d(j_n, g_i) \leq d(j_n, g_b), \text{ for } b=1, \ldots, K\} \quad \text{[Equation 28]}$$

Figure 8A:
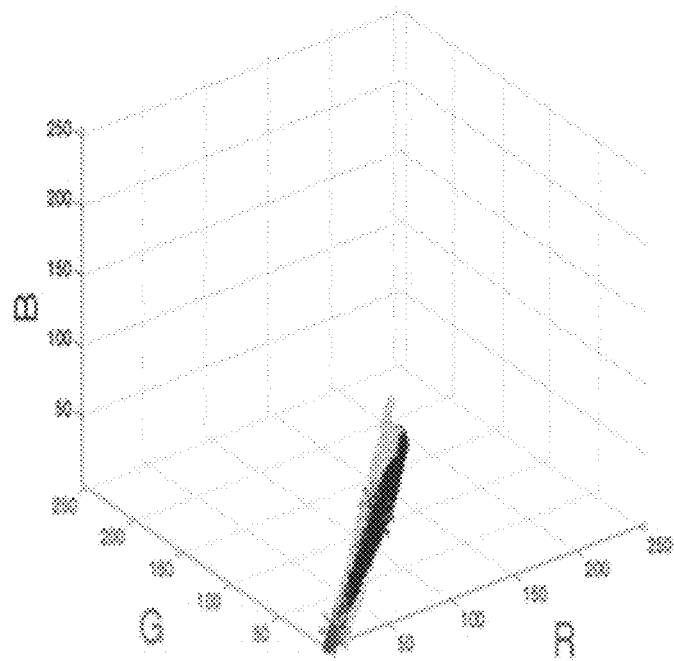
Figure 8B:
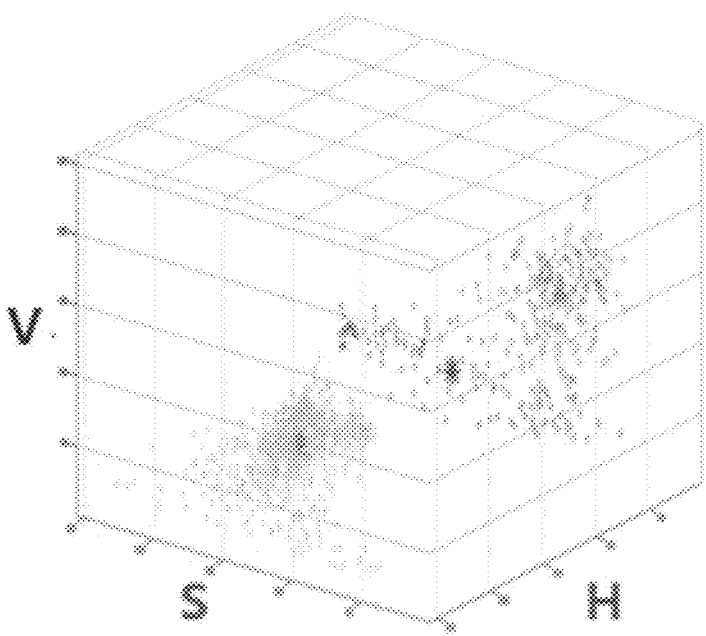

Each mean vector $g_i$ is updated by the mean of $j_n$ in the cluster $J_i$, and the entire process is repeatedly performed until no further change occurs in $g_i$. FIGS. 8A-8B show results of K-means clustering in RGB(FIG. 8A) and HSV color space (FIG. 8B) when K=3.

Figure 9A:
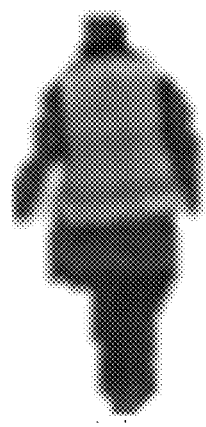
Figure 9B:
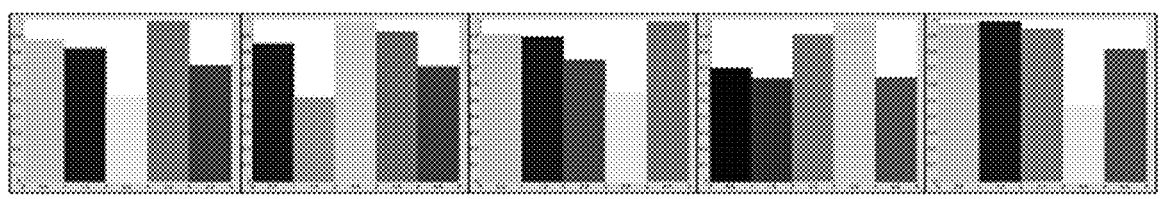
Figure 9C:
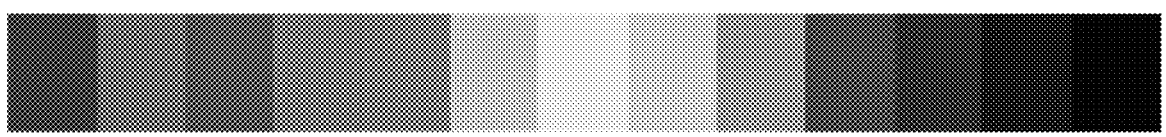

The fundamental problem of K-means clustering is that it is dependent on the initial cluster set, as shown in FIGS. 9A-9C. FIG. 9A represents an input image, FIG. 9B represents another result of K-means clustering, and FIG. 9C represents aligned colors of FIG. 9B.

Figure 10A:
Figure 10B:
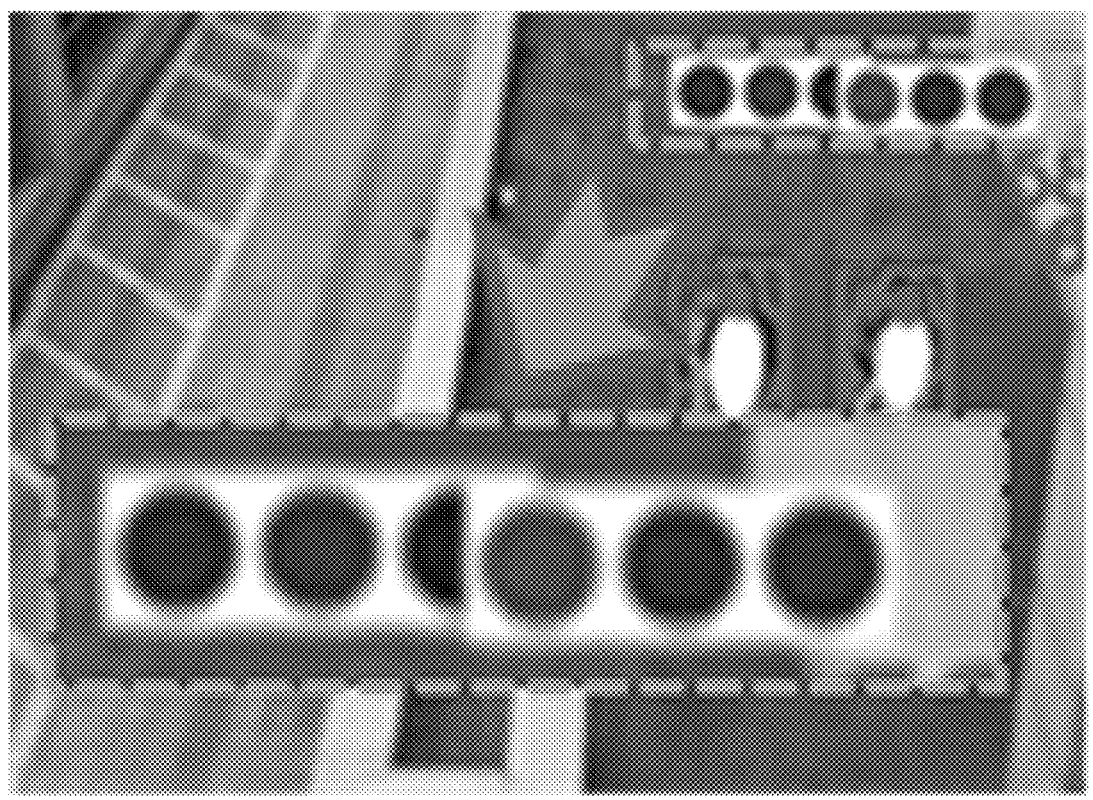
Figure 10C:
Figure 10D:
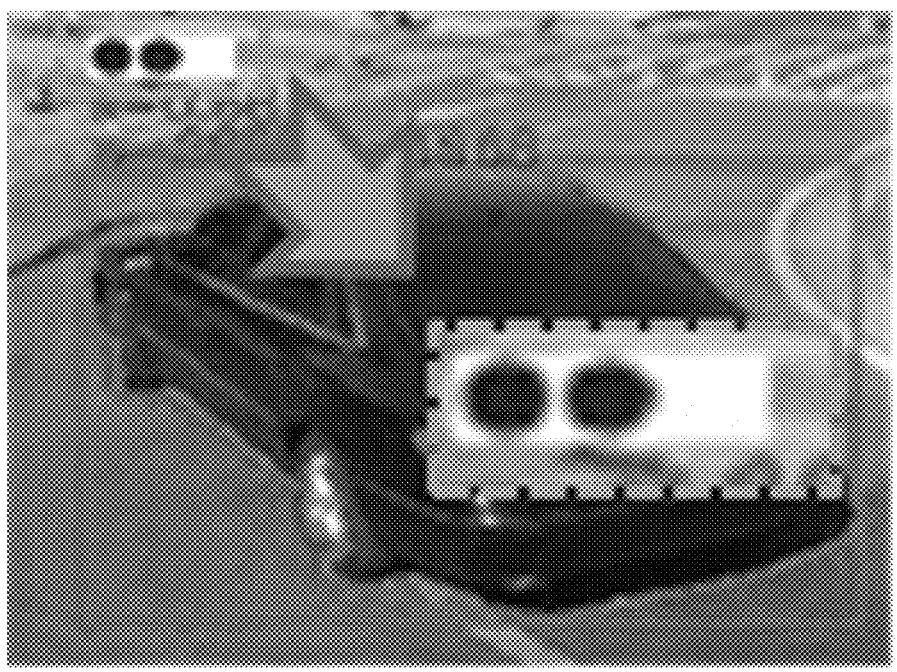

Since a single try of K-means clustering cannot guarantee representative color extraction, each frame generates a candidate color while tracking the object, and eventually only the top 25% of the stored candidate colors are selected. As a result, the representative color of the object is extracted accurately with some errors. FIGS. 10A-10D show an object in which representative colors are extracted. That is, FIG. 10A shows an input image including two persons, FIG. 10B shows a result of color selection, FIG. 10C shows an input image of a vehicle, and FIG. 10D shows a result of color selection.

When multiple cameras are used in video surveillance systems, the size and speed of an object are measured differently by different cameras. The normalized metadata of the object should be extracted from the world coordinates using camera parameters with which physical object information is accurately extracted.

When the projection matrix P and the coordinates of the foot and head are on the image plane, the height of the physical object may be calculated in meters. In order to extract physical information of an object from the three-dimensional world coordinates, the foot position on the ground plane $\tilde{X}_f = H^{-1}\tilde{x}_f$ is required to be calculated using Equation 1. On the other hand, the y coordinate on the image plane is calculated as follows:

$$y = \frac{P_{2,1} \cdot X + P_{2,2} \cdot Y + P_{2,3} \cdot H_O + P_{2,4}}{P_{3,1} \cdot X + P_{3,2} \cdot Y + P_{3,3} \cdot H_O + P_{3,4}} \quad \text{[Equation 29]}$$

Where P represents a projection matrix, and $H_o$ represents an object height. Using Equation 29, $H_o$ may be calculated from y as follows:

$$H_O = \frac{(P_{2,1} - P_{3,1} \cdot y)X + (P_{2,2} - P_{3,2} \cdot y)Y + P_{2,2} - P_{3,2} \cdot y}{P_{3,3} \cdot y - P_{2,3}} \quad \text{[Equation 30]}$$

Figure 11A:
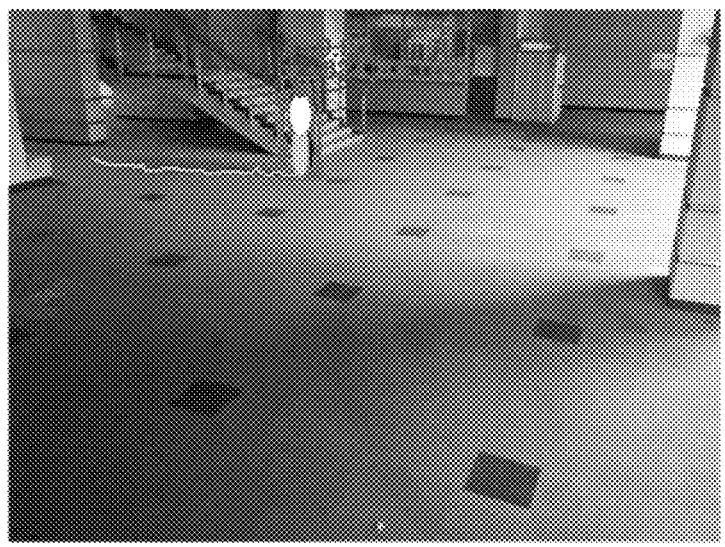
Figure 11B:
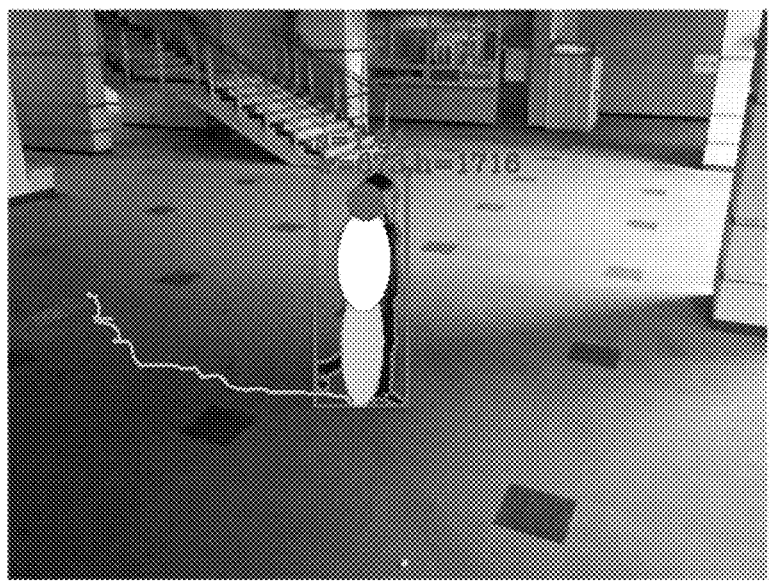

The width of the object $W_o$ is calculated as follows.

$$W_O = |X_O - X'_O| \cdot W_i \quad \text{[Equation 31]}$$

Where $X_o$ represents a foot position on the three-dimensional world coordinates, $X'_o$ represents a foot position corresponding to one pixel-shifted foot position on the image plane, and $W_i$ represents a width of the object on the image plane. FIGS. 11A-11B show an estimation result of the normalized object size. As shown in FIGS. 11A-11B, the estimated object height does not change while the object is moving. FIGS. 11A-11B show a result of size estimation of the same object, FIG. 11A shows a case where the object is far from the camera, and FIG. 11B shows a case where the object is close to the camera.

Figure 12A:
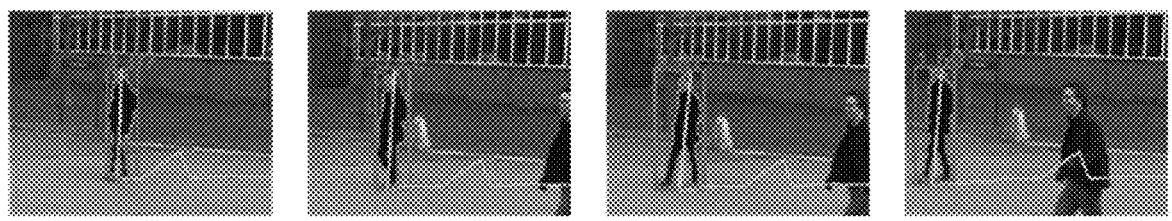
Figure 12B:
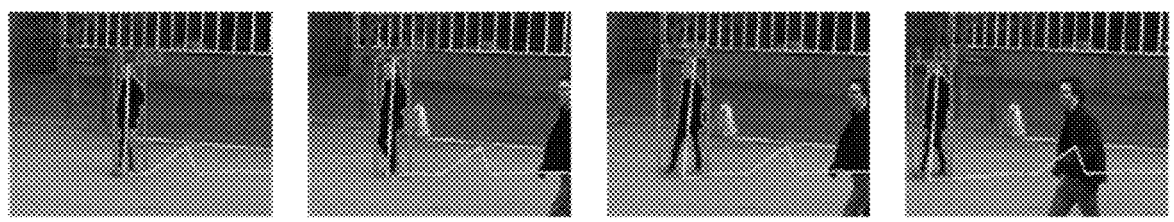

The object speed $S_o$ can be calculated as follows.

$$S_o = \sqrt{(X_o^t - X_o^{t'})^2 + (Y_o^t - Y_o^{t'})^2} \quad \text{[Equation 32]}$$

Where $(X_o^t, Y_o^t)$ represents a position of the object on the world coordinates in a t-th frame, and $(X_o^{t'}, Y_o^{t'})$ represents the position of the object one second earlier. However, direct estimation of $S_o$ from the foot position of the object is not robust due to object detection error. To solve this problem, the Kalman filter compensates for a velocity estimation error. FIGS. 12A-12B show results of estimation of the object velocity in a case where the Kalman filter is used and a case where the Kalman filter is not used. That is, FIG. 12A shows before the application of the Kalman filter and FIG. 12B shows after the application of the Kalman filter.

The aspect ratio of the object is simply calculated as follows:

$$R_O = H_i/W_i \quad \text{[Equation 33]}$$

Where $H_i$ and $W_i$ represent the object height and width, respectively, in the image plane. Instead of storing the entire trajectory of the object, in the embodiment of the present invention, object information is extracted using four positions in the entire trajectory. The object trajectory is defined as follows:

$$T_o = [x_0^1, y_0^1, x_0^2, y_0^2, x_0^3, y_0^3, x_0^4, y_0^4]_T \quad \text{[Equation 34]}$$

Where $[x_0\ y_0]^T$ is the start position, $[x_1\ y_2]^T$ is the 1/3 position, $[x_2\ y_2]^T$ is the 2/3 position, and $[x_4\ y_4]^T$ is the end position.

Five types of metadata of a representative color, a size, a moving speed, an aspect ratio, and a trajectory described above should be integrated into one data model to be stored in the database. Since object data is extracted from each frame, mean values of sizes, aspect ratios, and velocity data is stored in the right side of the frame before the object disappears. In addition, three representative colors are extracted from the previously selected color set using the K-means clustering algorithm.

The object metamodel containing object features, a serial number and frame information is shown in the table of FIG. 13. As shown in the table of FIG. 13, a frame duration, a moving distance, and an area size are used to classify 'various objects. Further, when extended to the future, the minimum and maximum values of the object features are stored in the metadata.

FIGS. 14 to 28 are diagrams illustrating experimental results for the normalized metadata generation method according to an embodiment of the present invention.

In order to evaluate performance of the scene calibration method according to an embodiment of the present invention, FIG. 14 summarizes the changes in object-mean values obtained from seven different scenes. In the experiment, normalized physical information of a human object with a height of 175 cm was extracted in various scenes. As shown in FIG. 14, camera parameters are estimated and corrected in each scene. Object A appears 67 times, and an object height is estimated every time.

Figure 15:
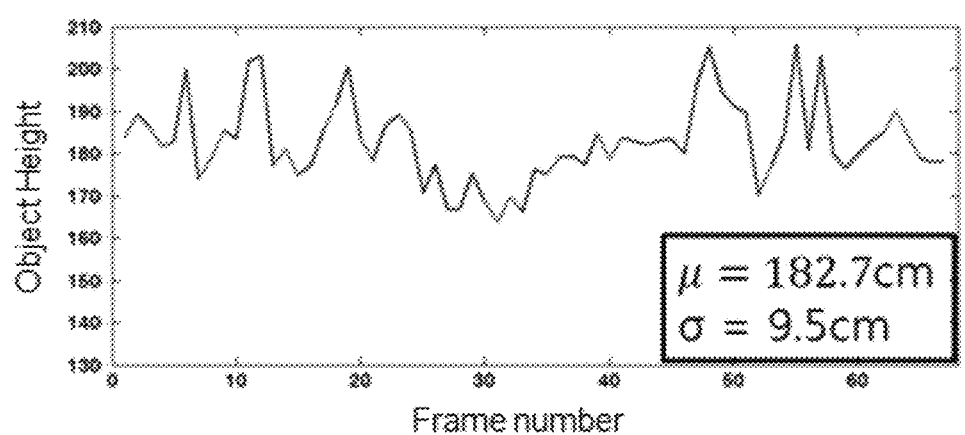
Figure 16A:
Figure 16B:
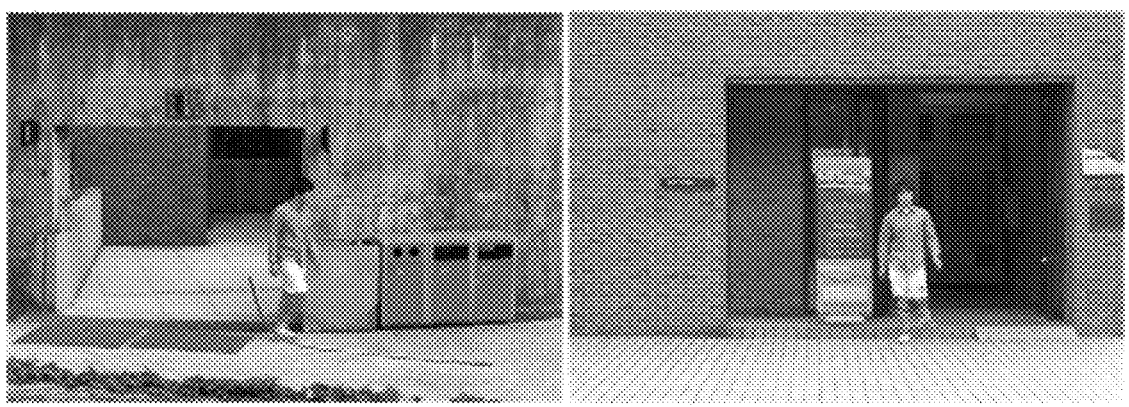
Figure 16C:
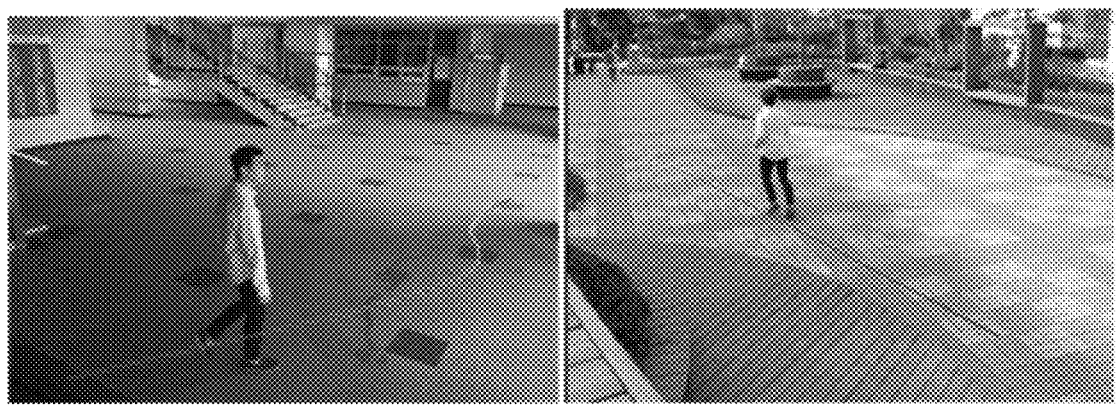
Figure 16D:
Figure 16E:
Figure 16F:
Figure 16G:
Figure 16H:

FIG. 15 shows that the average object height is 182.7 cm and the standard deviation of the object height is 9.5 cm. Since an actual height is 175 cm, an estimation error is 7.5 cm. This is because a reference height $h_w$ is set to 180 cm. This result shows that the scene calibration method according to the embodiment of the present invention is suitable to estimate the relative height rather than the absolute value.

FIGS. 16A-16G illustrate results of an experiment for searching for an object using color queries including (a) red, (b) green, (c) blue, (d) yellow, (e) orange, (f) purple, (g) white, and (h) black. FIG. 17 summarizes classification performance using object colors. The right-most column shows the number of all objects and their classification accuracy in parentheses. Experiments may classify objects accurately 96.7% on average.

Figure 18A:
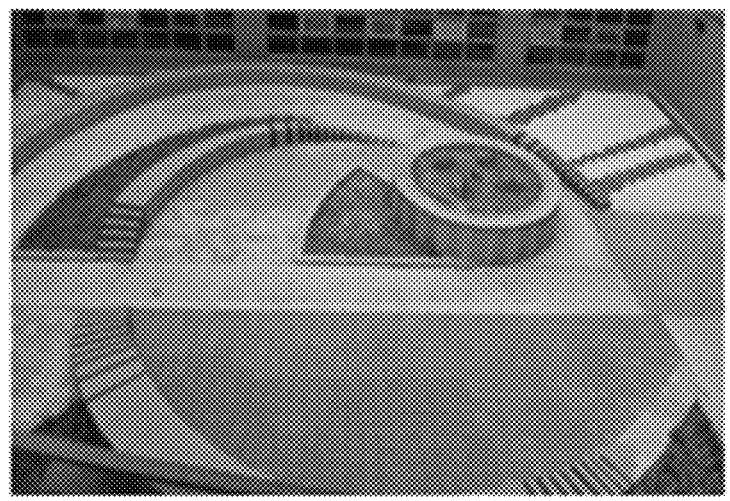
Figure 18B:
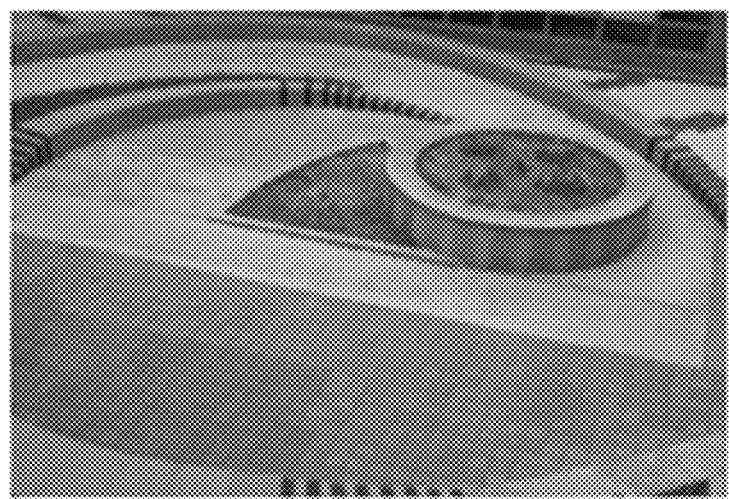
Figure 18C:
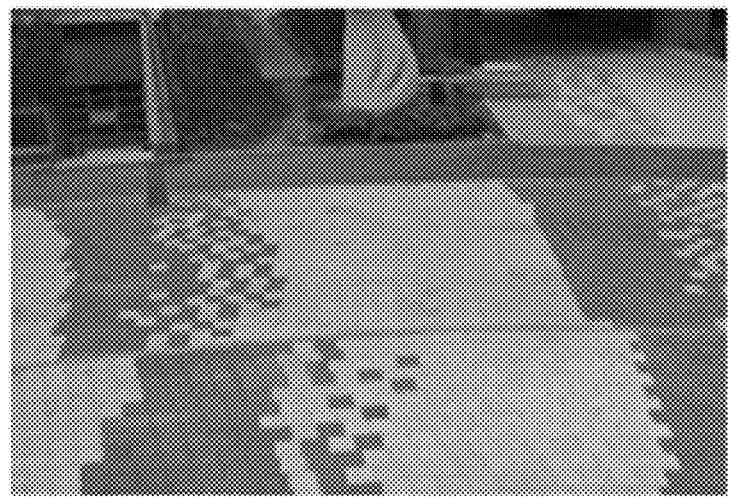
Figure 18D:
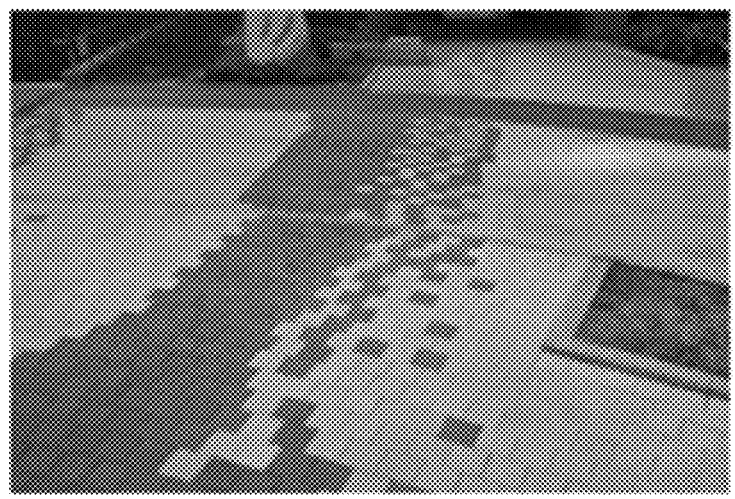
Figure 18E:
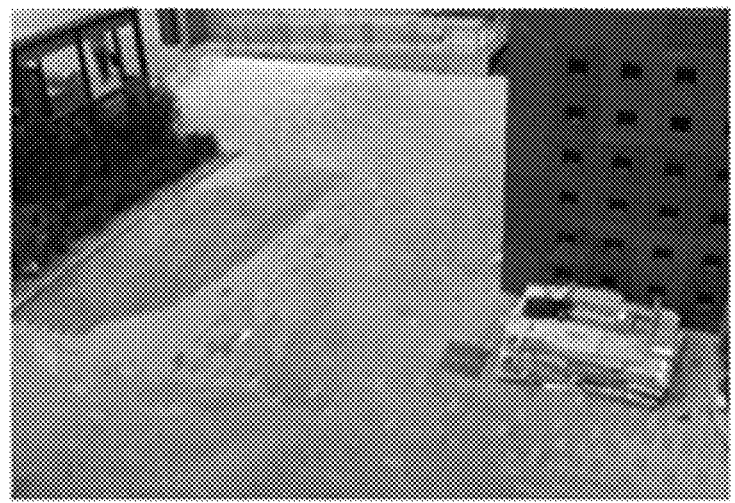
Figure 18F:
Figure 18G:
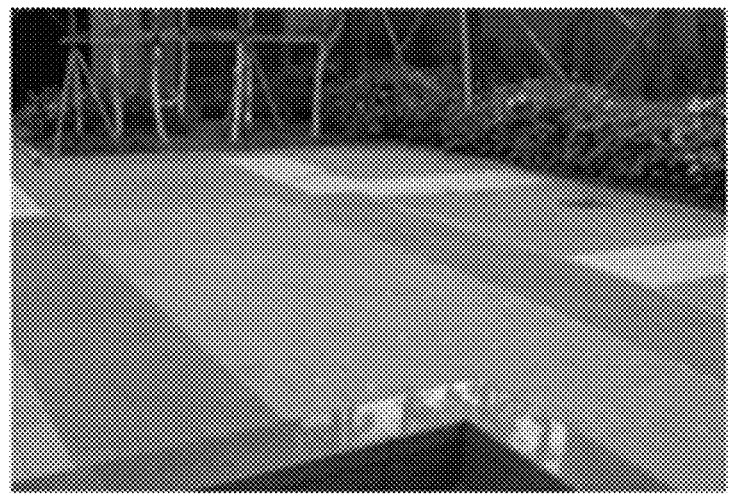
Figure 18H:

FIGS. 18A-18H show eight test videos having estimated camera parameters. FIG. 18A AND 18B are two images of a first scene acquired with different camera parameters, FIG. 18C AND 18D are two images of a second scene acquired with different camera parameters, FIG. 18E AND 18F are two images of a third scene acquired with different camera parameters, and FIG. 18G AND 18H are two images of a fourth scene acquired with different camera parameters.

Figure 19A:
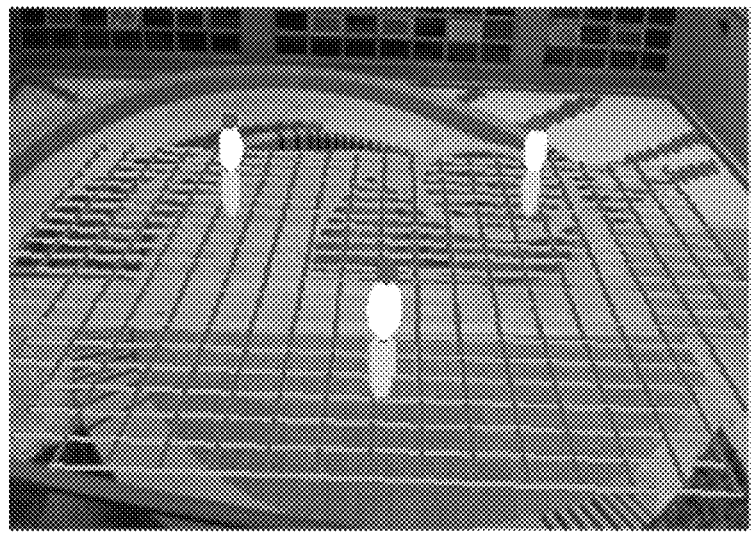
Figure 19B:
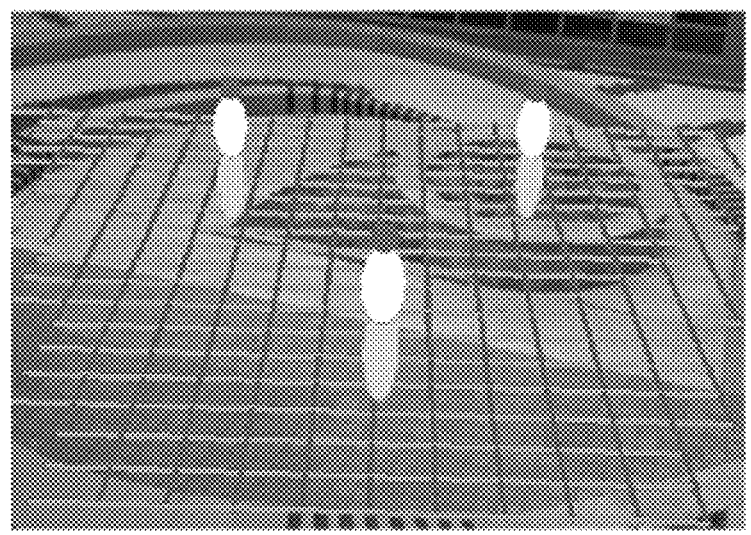
Figure 19C:
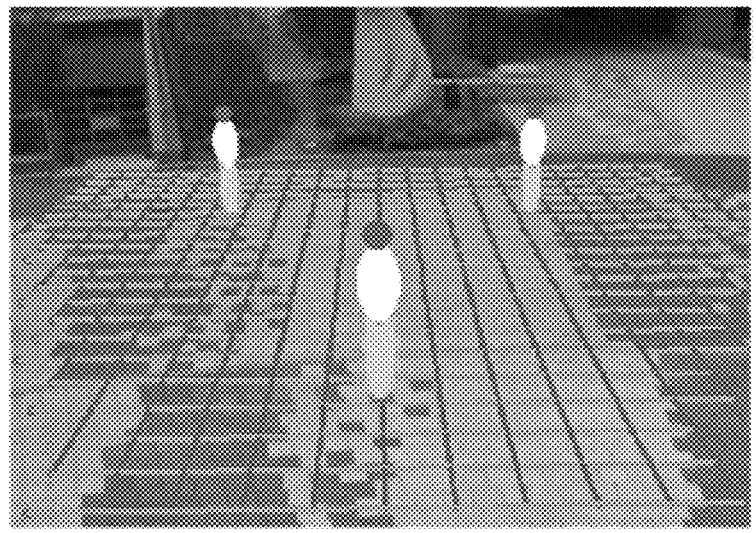
Figure 19D:
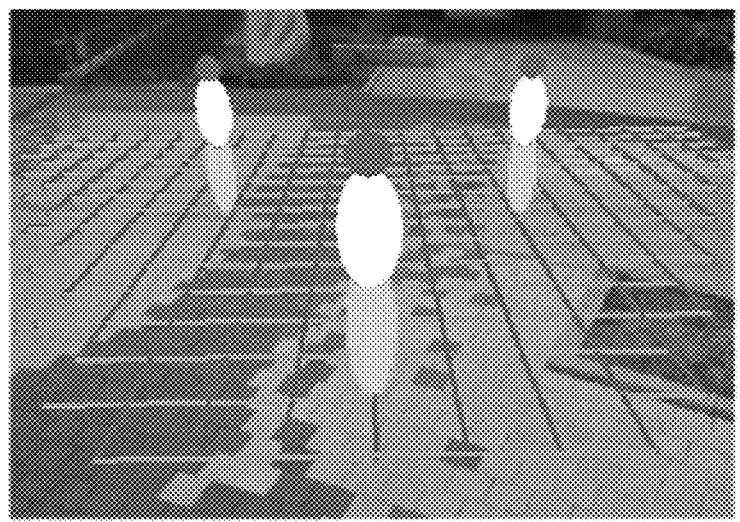
Figure 19E:
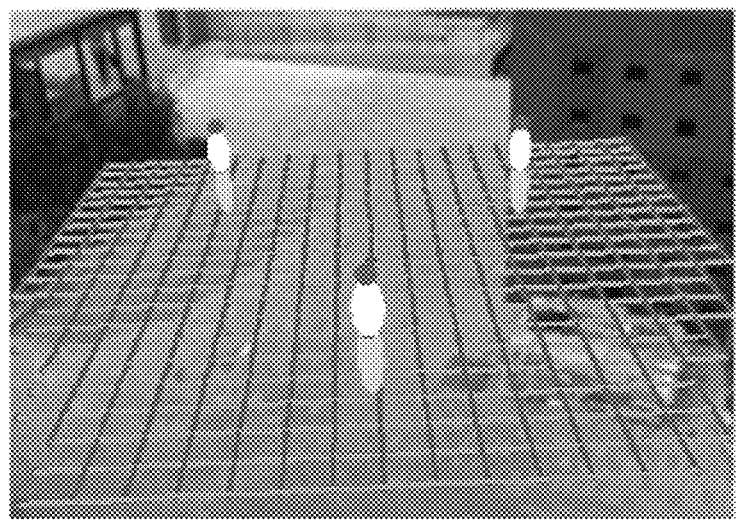
Figure 19F:
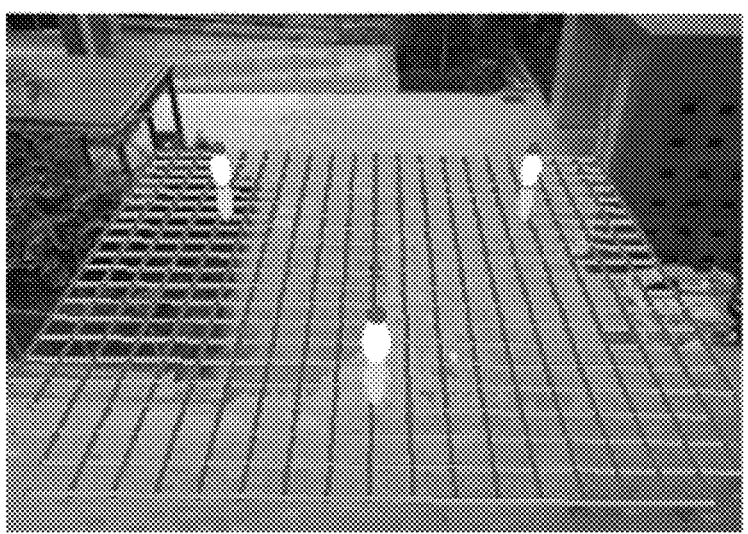
Figure 19G:
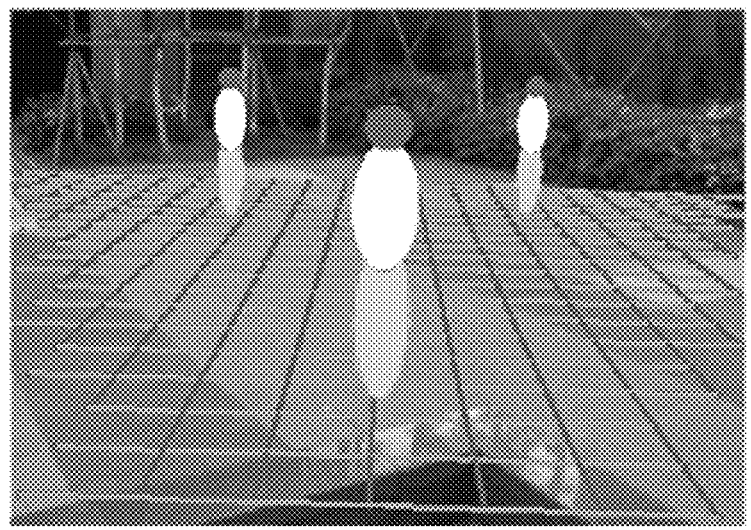
Figure 19H:
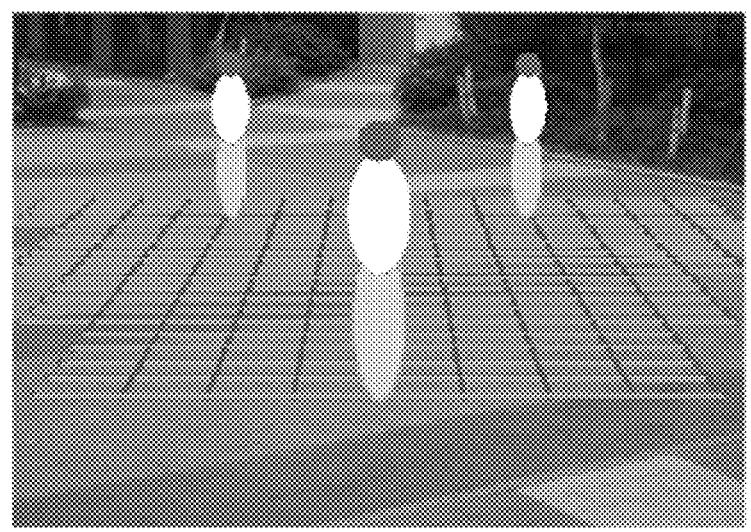

FIGS. 19A-19H show camera calibration results of eight test images in a virtual ground plane of a three-dimensional grid pattern and an ellipsoid with a 180-cm height. FIG. 19A AND 19B are camera calibration results of two images of the first scene acquired with different camera parameters, FIG. 19C AND 19D are camera calibration results of two images of the second scene acquired with different camera parameters FIG. 19E AND 19F are camera calibration results of the two images of the third scene acquired with different camera parameters, and FIG. 19G AND 19H is camera calibration results of the two images of the fourth scene acquired with different camera parameters.

Figure 20A:
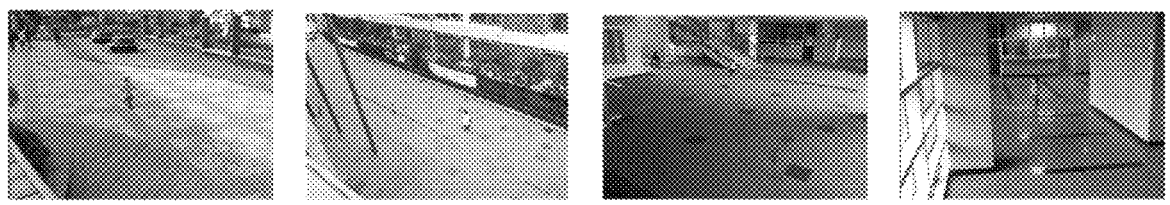
Figure 20B:
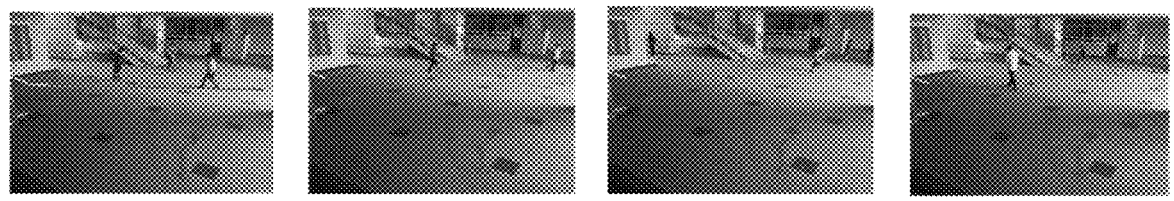
Figure 20C:
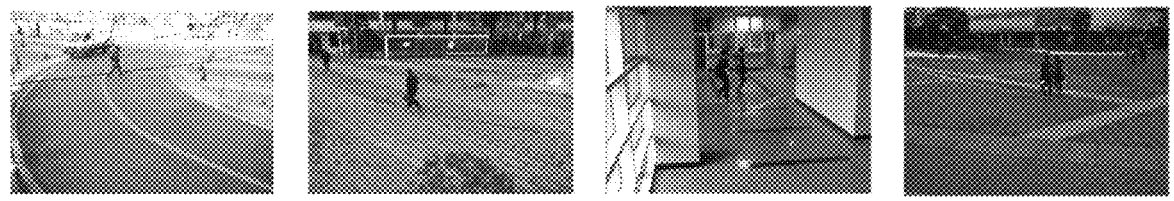

FIGS. 20A-20C show results of an object search experiment using size queries including a child (small, FIG. 20A), a juvenile (medium, FIG. 20B), and an adult (large, FIG. 20C). FIG. 20A shows that the normalized metadata generation method according to an embodiment of the present invention successfully searches for a child less than 110 cm, and FIGS. 20B and 20C show results similar to those of with respect to the juvenile and the adult.

FIG. 21 summarizes classification performance using an object size. The right-most column shows the number of all objects and their classification accuracy in parentheses. Experiments were able to classify objects 95.4% accurately on average.

Figure 22A:
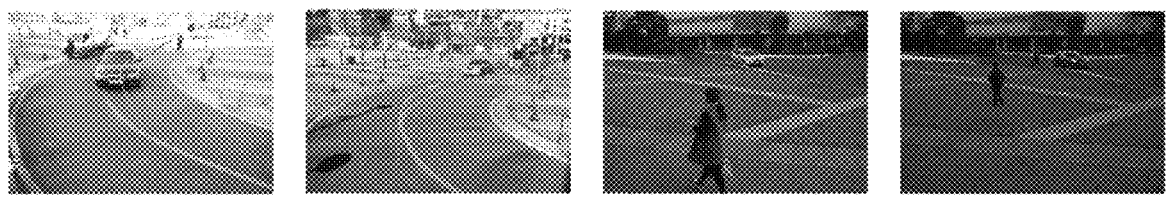
Figure 22B:
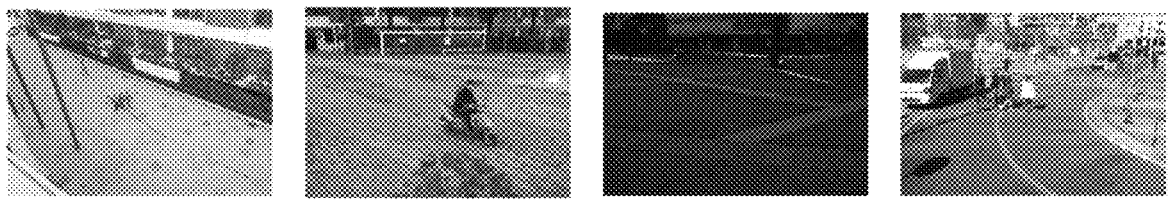
Figure 22C:
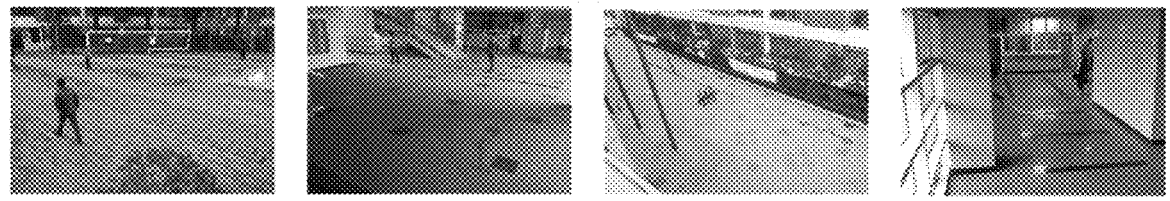

FIGS. 22A-22C show an experimental result of object search using an aspect ratio. A horizontal query is used to find a vehicle. A normal query is used to find motor cycles and groups of people. A vertical query is used to find a human object. That is, FIGS. 22A-22C show an object search result using horizontal (FIG. 22A), normal (FIG. 22B), and vertical aspect ratios (FIG. 22C).

FIG. 23 shows classification results using the aspect ratios. The right-most column shows the number of all objects and their classification accuracy in parentheses. The experiment was able to classify the objects accurately 96.9% on average.

Figure 24A:
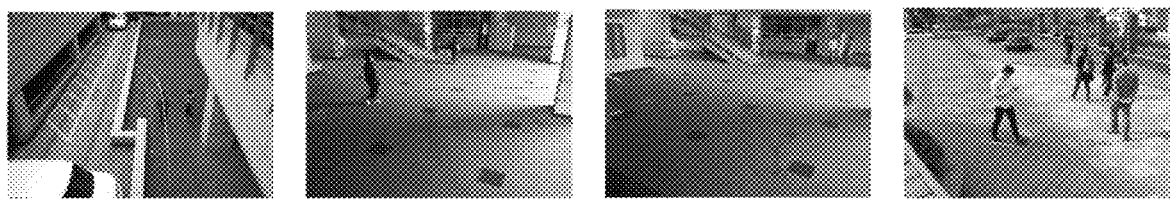
Figure 24B:
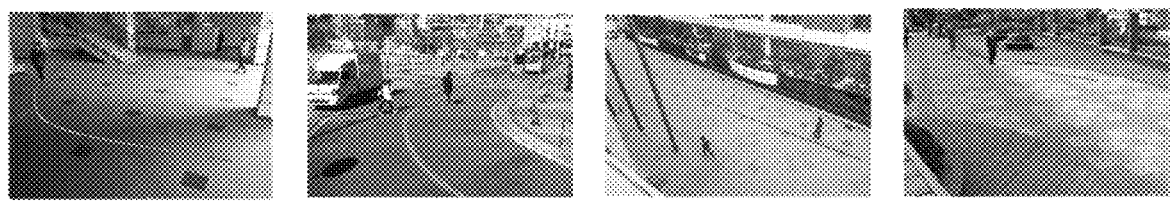
Figure 24C:
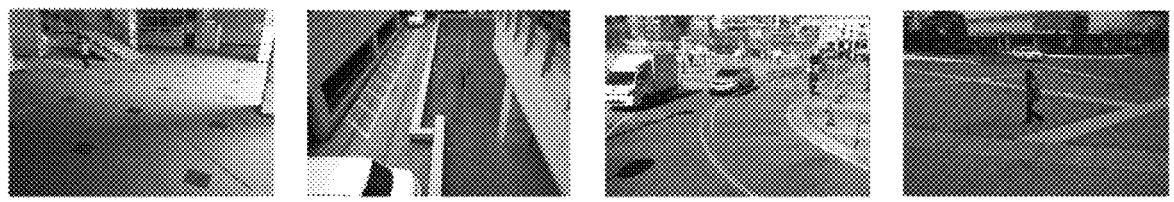

FIGS. 24A-24C show experimental results of object search using a speed query including slow (FIG. 24A), normal (FIG. 24B), and fast (FIG. 24C).

FIG. 25 shows search results and storing performance using an object velocity. As shown in FIG. 25, more than 95% of objects were accurately classified.

As described above, the tables shown in FIGS. 17, 21, 23, and 25 show the accuracy and reliability of the normalized metadata generation method according to the embodiment of the present invention. More specifically, color based search results show high accuracy with relatively diverse search options. For this reason, object color may be the most important feature for object classification.

Figure 26A:
Figure 26B:
Figure 27A:
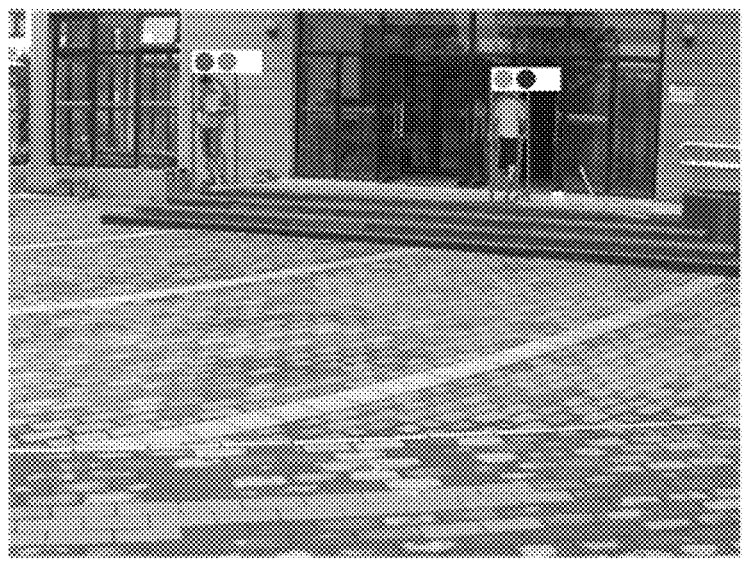
Figure 27B:
Figure 27C:
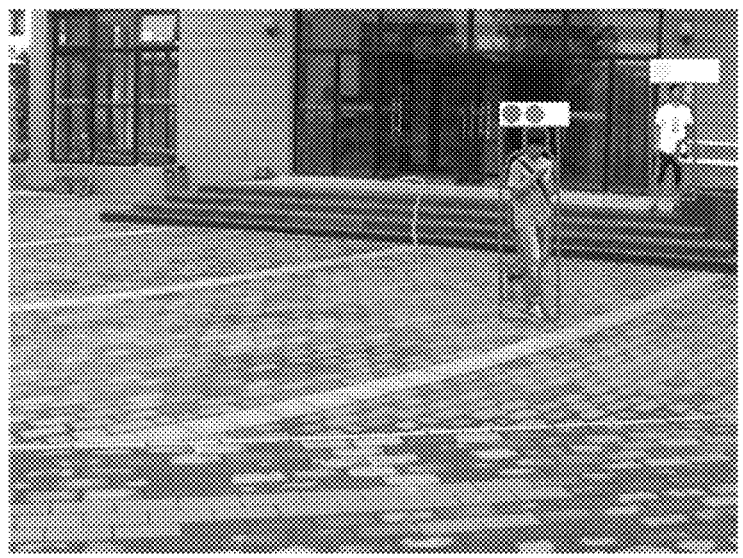
Figure 27D:

FIGS. 26A-26B show experimental results of object search using a user-defined boundary for detecting a moving direction. That is, FIG. 26A shows setting of a line, and FIG. 26B shows a search result.

FIGS. 27A-27D show experimental results of a normalized metadata generation method according to an embodiment of the present invention for a PRW (person re-identification in the wild) data set. That is, FIG. 27A to 27D represent four frames of a test video including people who are newly recognized. As shown in FIGS. 27A-27D, the color and trajectory of the object are accurately classified.

Figure 28:
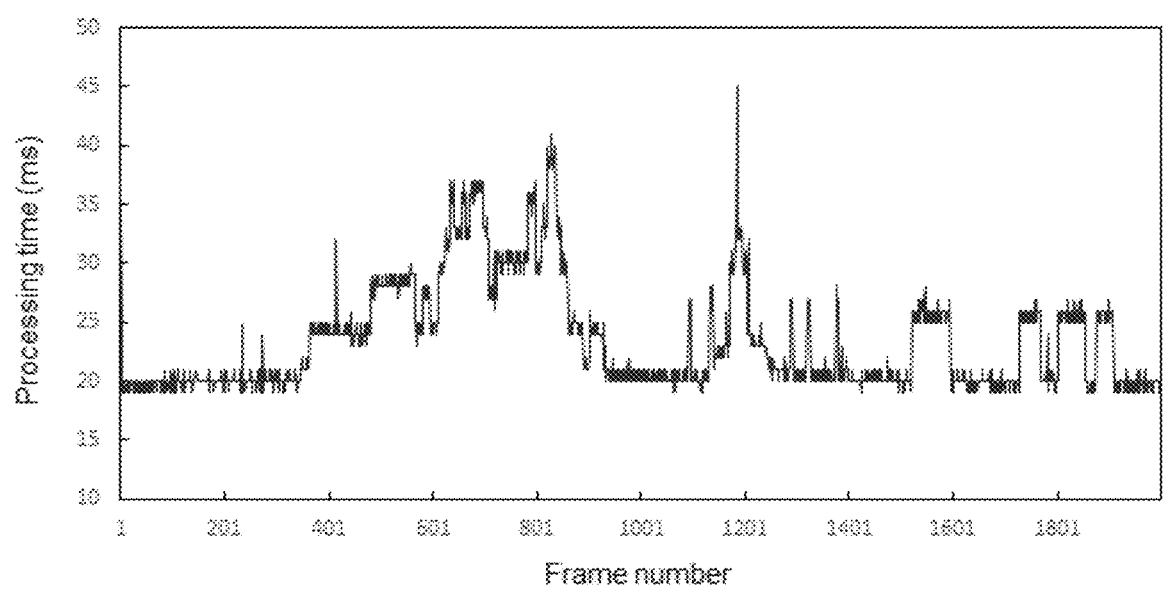

FIG. 28 shows a processing time of the normalized metadata generation method according to the embodiment of the present invention. For measurement of the processing time, a personal computer with a 3.6 GHz quad core CPU and 8 GBytes memory was used. As shown in FIG. 28, it took 20 to 45 ms to process one frame, and an average processing speed was 39 frames per second.

Figure 29:
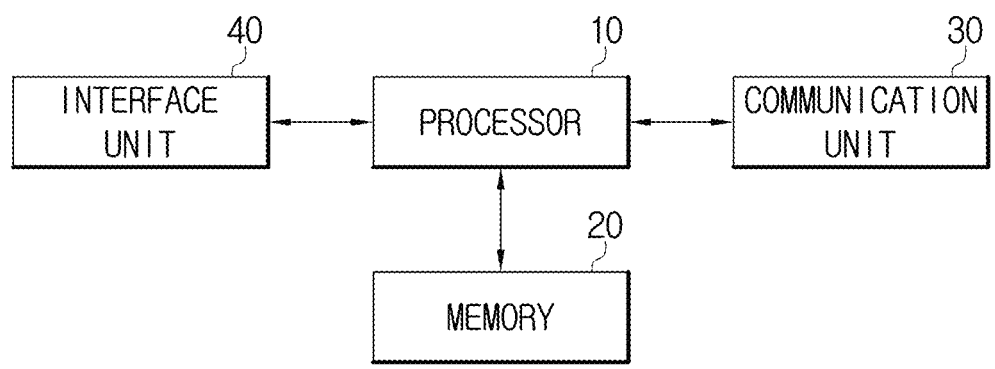
FIG. 29 is a diagram schematically illustrating a configuration of a normalized metadata generation device according to an embodiment of the present invention.

FIG. 29 is a diagram schematically illustrating a configuration of a normalized metadata generation device according to an embodiment of the present invention.

Referring to FIG. 29, a normalized metadata generation device according to an embodiment of the present invention includes a processor 10, a memory 20, a communication unit 30, and an interface 40.

The processor 10 may be a CPU or a semiconductor device that executes processing instructions stored in the memory 20.

The memory 20 may include various types of volatile or non-volatile storage media. For example, the memory 20 may include ROM, RAM, and the like.

For example, the memory 20 may store instructions for performing the normalized metadata generation method according to an embodiment of the present invention.

The communication unit 30 is a means for transmitting and receiving data to and from other devices through a communication network.

The interface unit 40 may include a network interface for connecting to a network and a user interface.

Figure 30:
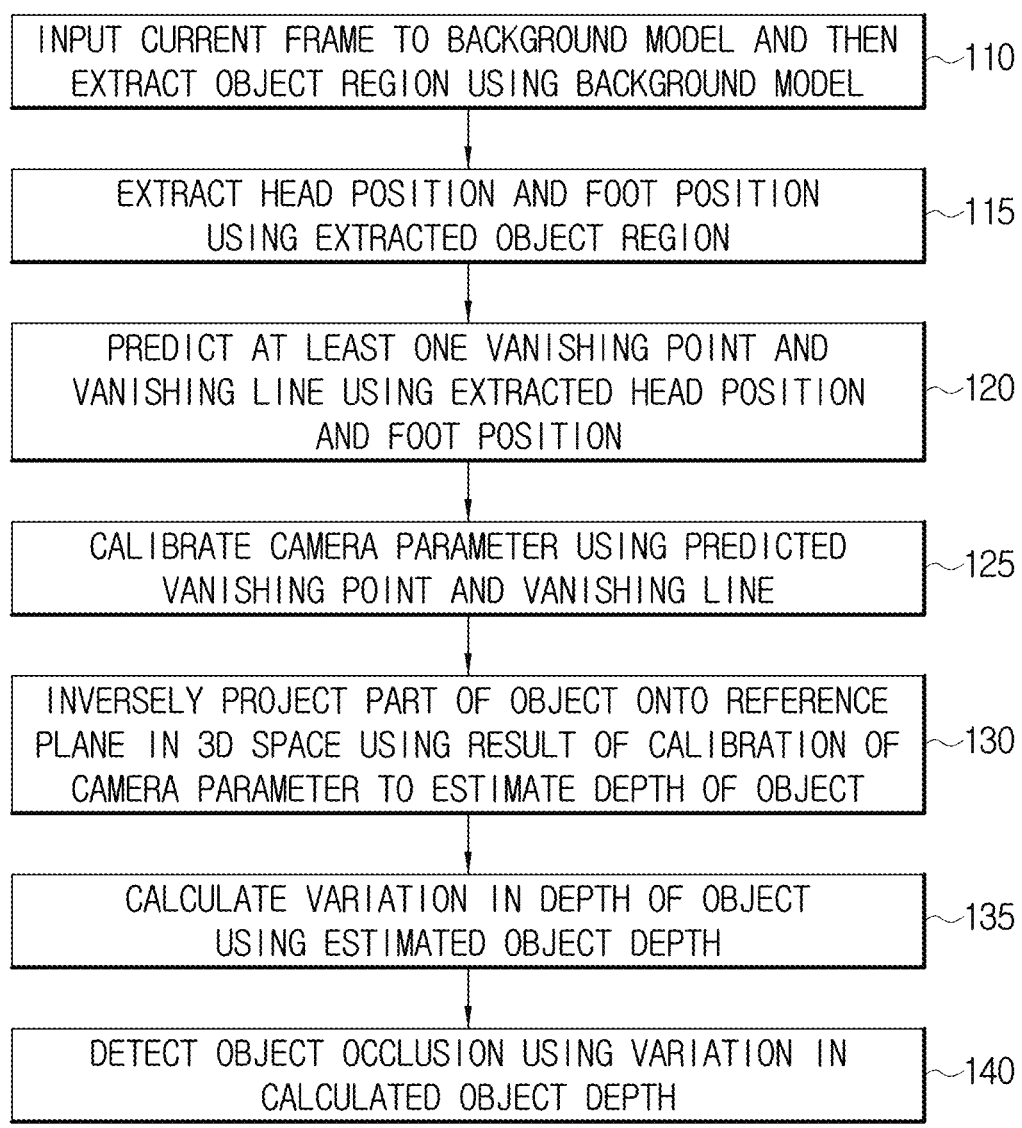
FIG. 30 is a flowchart of an object occlusion detection method according to an embodiment of the present invention.
Figure 31:
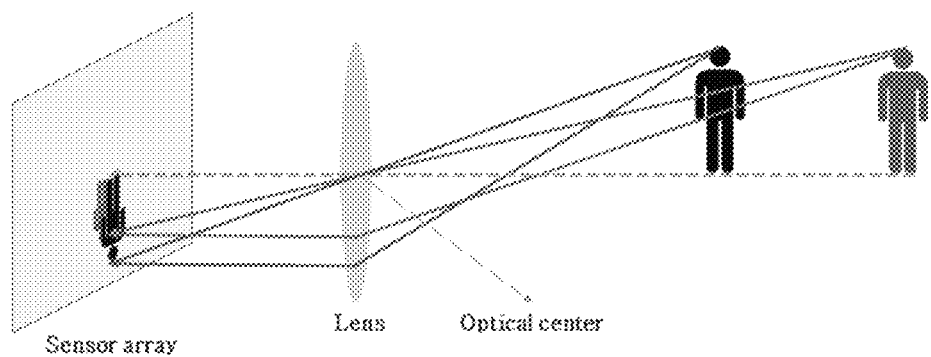
FIG. 31 is a diagram for describing a camera projection model according to an embodiment of the present invention.
Figure 32A:
FIGS. 32A-32B are diagrams showing lines connecting foot positions and head positions and background lines according to an embodiment of the present invention.
Figure 32B:
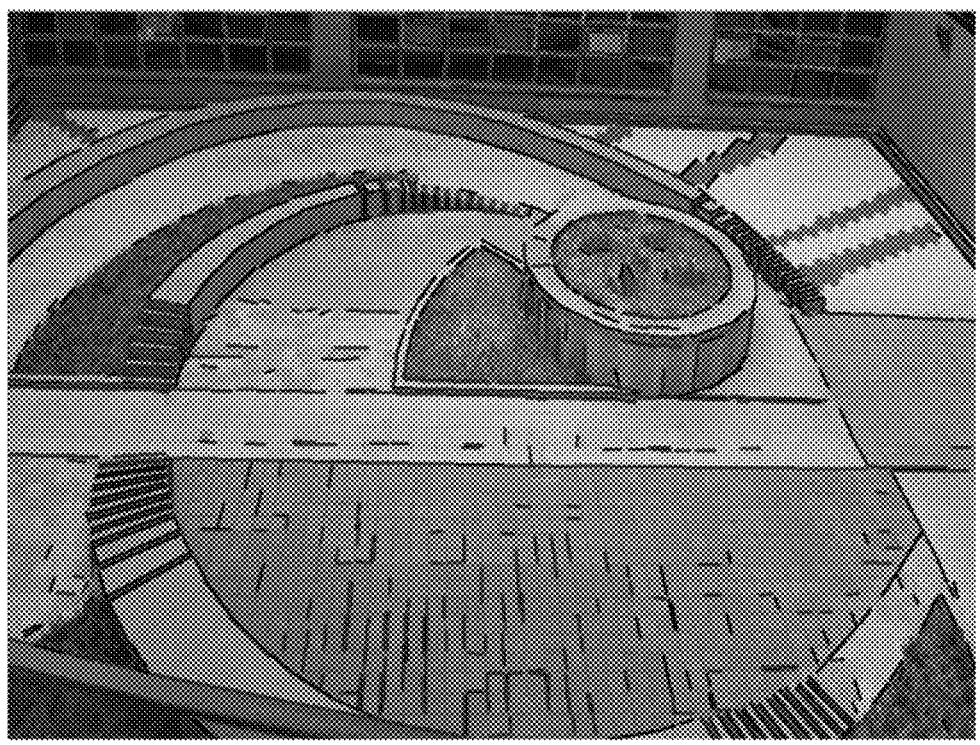
Figure 33:
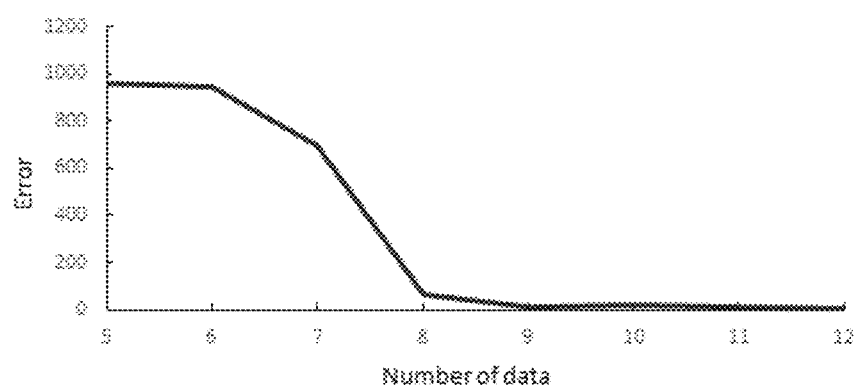
FIG. 33 is a diagram illustrates focal length estimation errors according to the number of data sets of foot and head positions according to an embodiment of the present invention.
Figure 34:
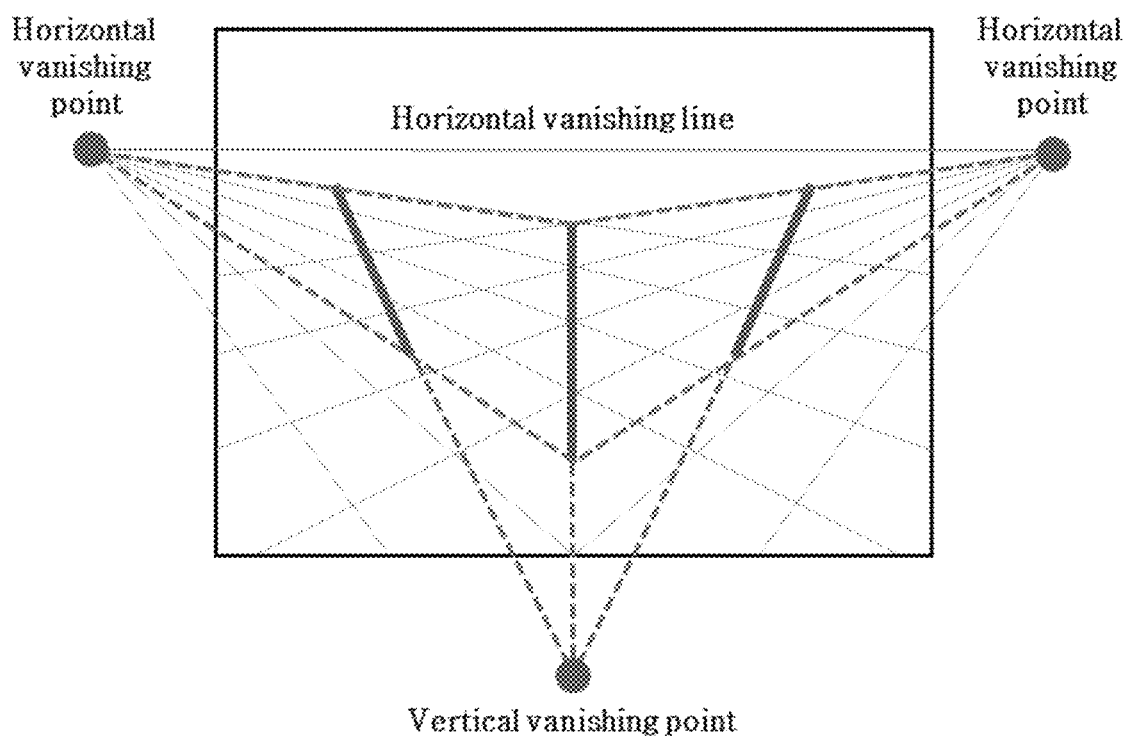
FIG. 34 is a diagram illustrating a vanishing point and a vanishing line according to an embodiment of the present invention.
Figure 35:
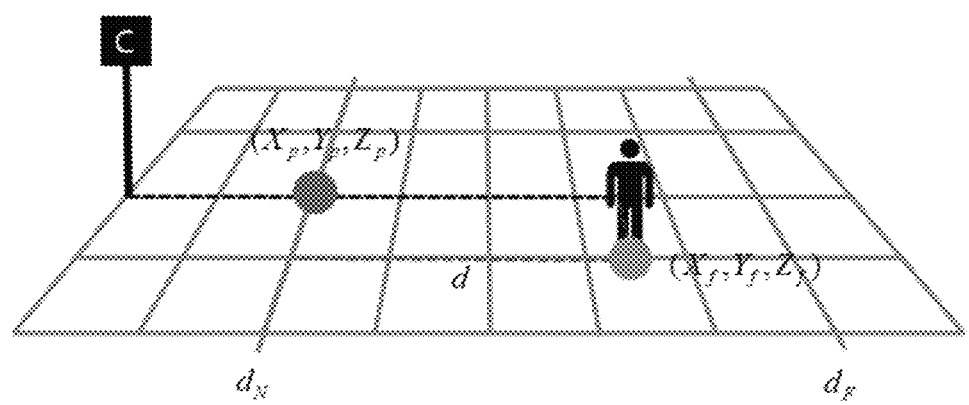
FIG. 35 is a view for explaining object depth prediction according to an embodiment of the present invention.

FIG. 30 is a flowchart of an object occlusion detection method according to an embodiment of the present invention, FIG. 31 is a diagram for explaining a camera projection model according to an embodiment of the present invention, and FIGS. 32A-32B are diagrams illustrating lines connecting a foot position and a head position and background lines according to an embodiment of the present invention, FIG. 33 is a diagram illustrating focal length prediction error according to the number of data sets of foot and head positions according to an embodiment of the present invention, and FIG. 34 is a diagram for explaining a vanishing point and a vanishing line according to an embodiment of the present invention, and FIG. 35 is a diagram for explaining object depth prediction according to an embodiment of the present invention.

Before explaining the object occlusion detection method, the linear camera geometry will be briefly described in order to facilitate understanding and explanation.

As well known, 3D spatial information is needed for depth prediction. To obtain projection relationship between the 2D image and the 3D spatial information, camera geometry including camera parameters describing a camera sensor, a lens, an optical axis, and the camera position on the coordinates was used.

In a pin-hole camera model, one point in 3D space may be projected to one point in the 2D image using Equation 35.

$$s \begin{bmatrix} x \\ y \\ 1 \end{bmatrix} = \begin{bmatrix} f_x & \text{skew} & p_x \\ 0 & f_y & p_y \\ 0 & 0 & a \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} = A[R|t]\begin{bmatrix} X \\ Y \\ Z \\ 1 \end{bmatrix}$$ [Equation 35]

Where s denotes a scale, $[x\ y\ 1]^T$ represents a point on a 2D video, matrix A is composed of inherent camera parameters, $f_x$ and $f_y$ represent x-axis and y-axis focal lengths, skew represents a degree of deformation, a represents an image ratio (video ratio), and R is a camera rotation matrix and is composed of a camera rotation parameter $r_{ij}$. In addition, $[t_1\ t_2\ t_3]^T$ represents a camera translation vector, and $[X\ Y\ Z\ 1]^T$ represents a point on a 3D space.

In the embodiment of the present invention, for convenience of understanding and description, description is given under the assumption that $f_x$ and $f_y$ are identical to each other, a center point is a center of a video, deformation is close to zero, and the image ratio (video ratio) is 1.

It is also assumed that the camera rotation angle with respect to the Z axis is zero, camera translation with respect to the x and y axes is zero, and the outer matrix [R|t] is calculated using Equation 36:

$$[R|t]=[R_Z(\rho)R_X(\theta)T(0,0,h_c)]$$ [Equation 36]

Where $R_Z$ represents a rotation matrix about the Z axis, $R_X$ represents a rotation matrix about the X axis, T represents transform for translation, and $h_c$ represents a camera height.

In the case of shooting a three-dimensional space, the 2D image is generated by light reflected by an object and arriving at a camera sensor. In this process, a single object is projected onto the 2D image to have a different size depending on a distance from the camera, as shown in FIG. 31. This allows parallel lines in the 3D space to be projected onto an area of the 2D image as non-parallel lines dependent on the depth.

The vanishing point may be predicted at the intersection of non-parallel lines using non-parallel lines that are apparent in the image. A projection camera transform model projects one point in the 3D space onto the camera sensor, and the camera parameters may be predicted using the vanishing point.

One point (position) in the 3D space may be projected onto the camera sensor to correspond to a point (position) in the 2D image using the projection conversion. However, since the camera projection transform is not a 1:1 function, one point of the 2D image is not projected back to a unique point in 3D space.

However, when there is a reference plane, one point of the 2D image may be projected back to a point on the predefined reference plane in a three-dimensional space.

Therefore, it should be understood that a method of detecting the occluded region of an object based on object depth prediction described below predicts an object depth using a 2D image based on a predetermined reference plane.

Hereinafter, a method for detecting an occluded region of an object will be described in detail with reference to FIG. 30.

In step 110, an object occlusion detection device 100 extracts an object region using a background model after inputting a current frame to the background model.

Here, the object occlusion detection device 100 may detect a moving object region by generating a Gaussian mixture model (GGM)-based background model by inputting the current frame. The object region may be detected by labeling an region larger than a reference value.

In step 115, the object occlusion detection device 100 detects a head position and a foot position using the extracted object region, individually.

For example, the object occlusion detection device 100 may determine the vertically highest position—the vertex—as the head position in the object region. In addition, the object occlusion detection device 100 may determine a position of about 20% from the bottom as the foot position, rather than determining the lowest position, in determining a vertically lower position as the foot position in the object region.

In step 120, the object occlusion detection device 100 predicts at least one vanishing point and a vanishing line using the detected head position and foot position.

For example, the object occlusion detection device 100 may detect the at least one vanishing point and the vanishing line by using a pair of parallel lines connecting the detected head position and foot position.

In general, the line connecting the head position and the foot position is not parallel because the lines changes while walking. Accordingly, the object occlusion detection device 100 according to an embodiment of the present invention may detect a uniform height of an object using a case where legs of a pedestrian cross each other. This may be expressed by the following Equation 37.

$$\frac{1}{n}\sum_{i=1}^{n}(p_i - p_f)^2 < T_C \qquad \text{[Equation 37]}$$

where n denotes the number of candidate foot positions, $p_i$ denotes a candidate foot position, $p_f$ denotes a detected foot position, and $T_C$ denotes a threshold value.

In FIGS. 32A-32B, the detected foot and head positions and background line information are illustrated. FIG. 32A illustrates a line connecting the detected foot and head, and FIG. 32B illustrates the background line information.

In theory, homography prediction for camera calibration requires four 2D coordinates to solve eight linear inequalities. However, an actual robust random sample consensus (RANSAC) based robust camera calibration requires at least eight coordinates to minimize calibration errors, as shown in FIG. 33.

In embodiments of the present invention, the vanishing point and the vanishing line may be predicted based on the number of foot and head positions of the object as follows:

First Embodiment

When the number of sets of foot and head detected is smaller than N, the vanishing point and the vanishing line may be predicted using the background line information.

For example, three vanishing points may be selected from intersections that intersect background line information using the RANSAC algorithm. At least one of the three selected vanishing points is determined as a vertical vanishing point. Then, a line connecting the remaining two vanishing points of the three vanishing points may be determined as a horizontal vanishing line.

Second Embodiment

When the number of sets of foot and head detected is greater than N and object movement is linear, the object occlusion detection device 100 can predict the vertical vanishing point using the foot and head positions of the object.

The vertical vanishing point may be determined at the intersection of the line connecting the foot and the head position, as shown in FIG. 34. However, since one horizontal vanishing point is predicted when the object moves linearly, it is impossible to predict the horizontal vanishing line. Therefore, the object occlusion detection device 100 may predict the vanishing line using the background line information.

Third Embodiment

When the number of sets of foot and head detected is greater than N and object movement is not linear, the object occlusion detection device 100 may predict the vanishing point and the vanishing line using the foot and head positions. A line connecting the positions of two feet of the detected foot positions (referred to as a foot line) and a line connecting the positions of two heads (referred to as a head line) are used to predict the horizontal vanishing point.

As a result, the horizontal vanishing line may be predicted using two horizontal vanishing points, as shown in FIG. 34.

In step 125, the object occlusion detection device 100 calibrates the camera parameters using the predicted vanishing point and the vanishing line.

For example, the object occlusion detection device 100 may calibrate camera parameters using two predicted vertical vanishing points and the horizontal vanishing line. This can be expressed by Equation 38.

$$f = \sqrt{(a_3/a_2 - p_y)(v_y - p_y)} \qquad \text{[Equation 38]}$$
$$\rho = \operatorname{atan}(-v_x/v_y)$$
$$\theta = \operatorname{atan}\left(-\sqrt{v_x^2 + v_y^2}\,/f\right)$$
$$h_c = h_o \Big/ \left(1 - \frac{d(o_h, v_l)\|o_f - v\|}{d(o_f, v_l)\|o_h - v\|}\right)$$

Where f denotes the focal length, $\rho$ denotes the roll angle, $\theta$ denotes the tilt angle, $h_c$ denotes the camera height, $v_l$ denotes the horizontal vanishing line such as $a_1x+a_2y+a_3=0$, $v=[v_x\ v_y]^T$ denotes the vertical vanishing point, $h_o$ denotes the object height, $o_f$ denotes the foot position of the object, $o_h$ denotes the head position of the object, and d(A,B) denotes the distance between position A and position B.

In step 130, the object occlusion detection device 100 estimates the depth of the object by inversely projecting a part of the object onto the reference plane in the 3D space using results of camera parameter calibration.

For estimation of the depth of the object, the coordinates of the 2D image are projected onto the reference plane in the 3D space using the projection matrix. The foot position of the object is placed on the ground plane, the camera height is calculated as the distance between the ground plane and the camera, and the ground plane is regarded as the XY plane, so the ground plane may be used as the reference plane.

The foot position of the object with respect to the reference plane (ground plane) in the 3D space may be calculated using the foot position of the object in the 2D image. To detect the foot position in the 3D space, the foot position in the 2D image may be projected inversely onto the reference plane in the 3D space using the projection matrix. This may be expressed by the following Equation 39:

$$X = (P^T P)^{-1} P^T x_f \qquad \text{[Equation 39]}$$

Where $x_f$ denotes the foot position on the 2D image, P denotes the projection matrix, and X denotes the coordinates of the inversely-projected $x_f$. The coordinates of the inversely-projected X are normalized by the Z-axis value to detect the foot position in the 3D space as in Equation 40.

$$X_f = \frac{X}{Z} \qquad \text{[Equation 40]}$$

where Z denotes the Z-axis value of X, and $x_f$ denotes the foot position on the reference plane (ground plane) in the 3D space.

The depth of the object may be predicted by calculating the distance between the object and the camera.

However, the foot position is shown at limited positions in the input image. Therefore, in the embodiment of the present invention, the foot position closest to the center point for prediction of the object depth is used. The predicted depth may be normalized using the farthest distance with respect to the center point.

When the object is sufficiently far from the camera, the depth of the foot position of the object may be estimated as a Y-axis coordinate because a camera pan angle is zero and the center point is on the ground plane.

However, when the object depth is not equal to the depth of the foot position of the object, the object depth may be calculated using Equation 41.

$$d = \frac{|Y_f - Y_p|}{d_F} \quad \text{[Equation 41]}$$

where d denotes the object depth, $Y_p$ denotes the Y-axis value of the center point, $Y_f$ denotes the foot position the object, and $d_F$ denotes the farthest distance.

FIG. 35 is a diagram for explaining object detection prediction. In FIG. 35, $d_N$ denotes the nearest distance, $(X_p, Y_p, Z_p)$ denotes the center point, and $(X_f, Y_f, Z_f)$ denotes the foot position of the object.

In step 135, the object occlusion detection device 100 calculates a variation in the depth of the object using the estimated object depth.

The object occlusion detection device 100 may calculate the variation in the depth of the object using the estimated depth of an object of a current frame and the estimated depth of an object of a previous frame. That is, the variation in the depth of the object may be calculated by the difference between an estimate for the depth of the object of the current frame and an estimate for the depth of the object of the previous frame.

In step 140, the object occlusion detection device 100 detects occlusion of the object using the calculated variation in the depth of the object.

A depth of the same object in an adjacent frame changes slowly. If the object is occluded, the predicted depth of the object changes quickly. Based on this observation, the object occlusion may be detected as in Equation 42.

$$O = \begin{cases} \text{ture}, & \text{if } |d_{t-1} - d_t| \geq T_O \\ \text{false}, & \text{otherwise} \end{cases} \quad \text{[Equation 42]}$$

where O denotes results of object occlusion detection, $d_t$ denotes the depth of the object at time t, and $T_O$ denotes the threshold value for object occlusion detection.

When the variation in the depth becomes larger than the threshold value in the t-th frame and the previous frame of the object, an occluded state of the object may be detected.

Figure 36:
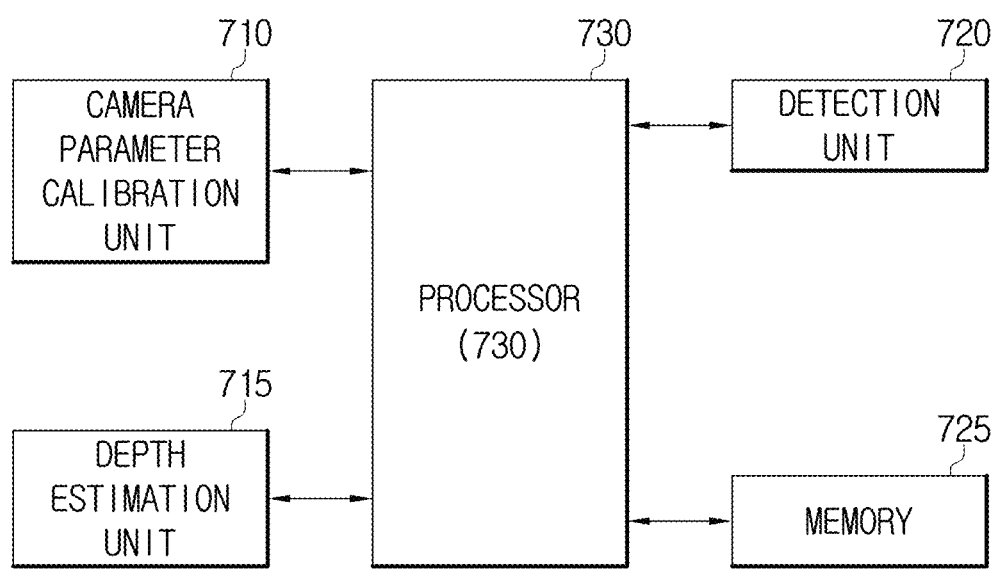
FIG. 36 is a block diagram schematically showing an internal configuration of an object occlusion detection device according to an embodiment of the present invention.

FIG. 36 is a block diagram schematically illustrating an internal configuration of an object occlusion detection device according to an embodiment of the present invention.

Referring to FIG. 36, the object occlusion detection device 100 according to an embodiment of the present invention includes a camera parameter calibration unit 710, a depth estimation unit 715, a detection unit 720, a memory 725, and a processor 730.

The camera parameter calibration unit 710 extracts an object region using a background model after inputting a current frame into the background model, detects a vanishing point and a vanishing line using the extracted object region, and calibrates camera parameters based on the vanishing point and the vanishing line.

For example, the camera parameter calibration unit 710 may detect a foot position and a head position of the object region, and then detect at least one vanishing point and a vanishing line using at least one of a parallel line connecting the detected foot position and head position and background line information. This is the same as that already described in detail with reference to FIG. 30, so that redundant description will be omitted.

The depth estimation unit 715 estimates a depth of the object by inversely projecting positions of a part of the object onto the ground plane in the 3D space using results of calibration of the camera parameter.

The detection unit 720 estimates a variation in the depth of the object using the estimated depth of the object and an estimated depth of the object in the previous frame and detects occlusion of the object in the current frame using the variation the depth of the object.

The memory 725 is means for storing various algorithms necessary to perform a method of detecting an occluded state by extracting an object from a video and then estimating the variation in a depth of the object, various data derived during processing thereof, and the like.

The processor 730 is means for controlling internal components of the object occlusion detection device 100 according to an embodiment of the present invention (e.g., the camera parameter calibration unit 710, the depth estimation unit 715, a detection unit 720, and the memory 725, etc.).

The above-described object occlusion detection device 100 may be included as a part in a surveillance camera or the like and be used for object tracking and recognition.

FIGS. 37A-37D are diagrams illustrating a result of object occlusion detection according to an embodiment of the present invention.

Figure 37A:
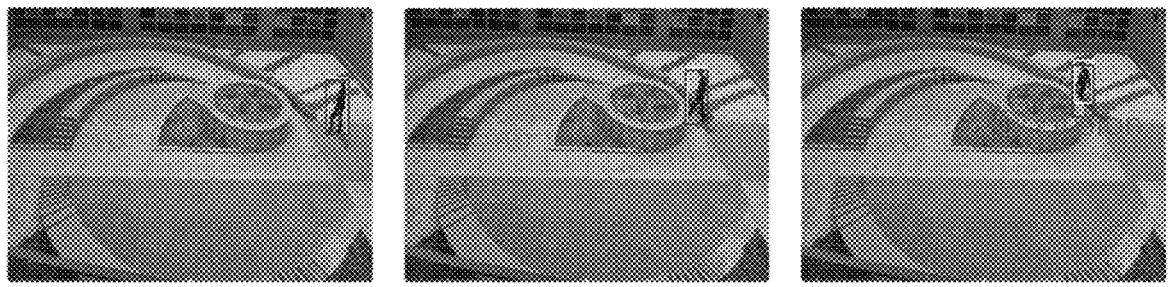
FIGS. 37A-37D are diagrams showing results of object occlusion detection according to the embodiment of the present invention.
Figure 37B:
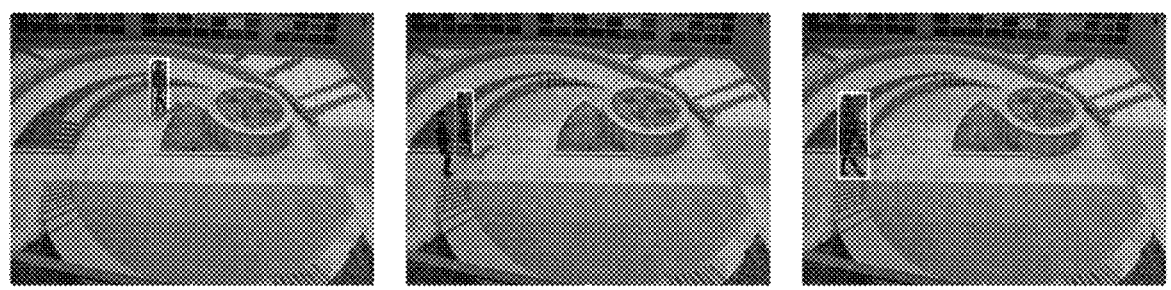
Figure 37C:
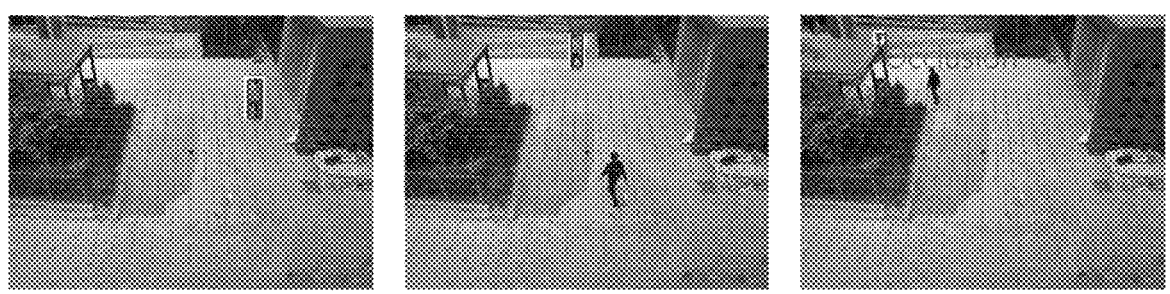
Figure 37D:
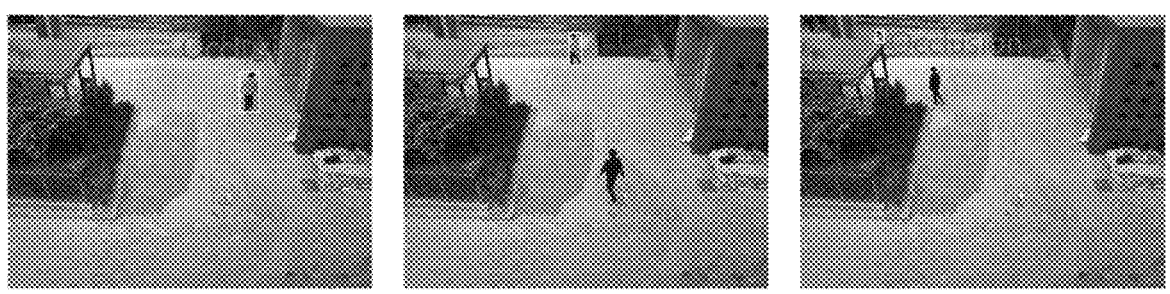

FIG. 37A shows results of detection of an object occluded by the background, FIG. 37B shows results of detection of an object occluded by the other object, and FIG. 37C shows detection results in another test video, and FIG. 37D shows a result of erroneously detecting the y-axis value of a foot position in the another test image due to occlusion.

In FIG. 37D, an error occurs in detecting an object because the depth information of the object is not used. On the other hand, it is understood that the present invention can accurately detect object occlusion regardless of scenes by using depth information of the object in the 3D space.

On the other hand, the components of the above-described embodiment can be easily grasped from a process viewpoint. That is, each component can be identified as a respective process. Further, the process of the above-described embodiment can be easily grasped from the viewpoint of the components of the device.

In addition, the above-described technical features may be implemented in the form of program instructions that can be executed through various computer means and recorded in a computer-readable medium. The computer-readable medium may include program instructions, data files, data structures, and the like, alone or in combination. The program instructions recorded on the medium may be those specially designed and constructed for the embodiments or may be available to those skilled in the art of computer software. Examples of computer-readable media include magnetic media such as hard disks, floppy disks, and magnetic tape; optical media such as CD-ROMs and DVDs; magnetic media such as floppy disks; Magneto-optical media, and hardware devices specifically configured to store and execute program instructions such as ROM, RAM, flash memory, and the like. Examples of program instructions include machine language code such as those produced by a compiler, as well as high-level language code that can be executed by a computer using an interpreter or the like. The hardware device may be configured to operate as one or more software modules to perform the operations of the embodiments, and vice versa.

It will be apparent to those skilled in the art that various modifications, additions and substitutions are possible, without departing from the spirit and scope of the invention as defined by the appended claims. Should be regarded as belonging to the following claims.

The invention claimed is:

1. A normalized metadata generation method, the method is performed by a metadata generation device of a multi-camera-based video surveillance system including different kinds of cameras, the method comprising:
   generating a multi-ellipsoid based three-dimensional (3D) human model using perspective features of a plurality of two-dimensional (2D) images obtained by the multiple cameras;
   performing scene calibration based on the three-dimensional human model to normalize object information of an object included in the two-dimensional images; and
   generating normalized metadata of the object from the two-dimensional images on which the scene calibration is performed,
   wherein the generating of the normalized metadata of the object includes:
   compensating colors of the two-dimensional (2D) image;
   extracting representative color information;
   extracting non-color metadata; and
   integrating the extracted metadata into one data model.

2. The normalized metadata generation method of claim 1, wherein the generating of the three-dimensional human model generates a human model having a height from a position of a foot, using three ellipsoids including a head, a body, and a leg in 3D world coordinates.

3. The normalized metadata generation method of claim 2, wherein the ellipsoid is back-projected onto a two-dimensional space to match an actual object to perform shape matching.

4. The normalized metadata generation method of claim 3, wherein a moving object region is detected by background modeling using a Gaussian mixture model (GMM) and a detected shape is normalized, to perform the shape matching.

5. The normalized metadata generation method of claim 4, wherein the normalized shape is calculated as a set of boundary points and each of the boundary points is generated at a position where a radial line from a center of gravity meets an outermost boundary of the object.

6. The normalized metadata generation method of claim 5, wherein the performing of the scene calibration includes
   extracting valid data for line segments from the foot to the head;
   estimating homology from the foot to the head using the extracted valid data; and
   detecting a vanishing line and a vanishing point from the homology.

7. The normalized metadata generation method of claim 6, wherein the valid data is selected according to a first condition that the line segment from the foot to the head is within a restricted region with respect to a y-axis and a second condition that the line segment from the foot to the head is a major axis of an ellipse to be approximated to a human object.

8. The normalized metadata generation method of claim 7, wherein an angle, a major axis and a minor axis of the object are calculated through matching operation between the object and the ellipsoid to acquire the valid data.

9. The normalized metadata generation method of claim 6, wherein invalid data is removed from the extracted valid data using robust random sample consensus (RANSAC) to prevent error due to the homology from the foot to the head.

10. The normalized metadata generation method of claim 6, wherein the vanishing line and the vanishing points are determined by three human positions which are not on the same line.

11. The normalized metadata generation method of claim 10, wherein the vanishing points are points under the ground plane, at which line segments from the foot to the head respectively representing positions of humans standing at various positions on the ground plane extend and meet each other.

12. The normalized metadata generation method of claim 10, wherein the vanishing line is a line segment connecting a first point and a second point,
   wherein the first point is a point at which a straight line connecting head points of a first human position and a second human position and a straight line connecting foot points of the first human position and the second human meet each other, and
   wherein the second point is a point at which a straight line connecting head points of the first human position and a third human position and a straight line connecting foot points of the first human position and the third human meet each other.

13. The normalized metadata generation method of claim 6, wherein the homology from the foot to the head is determined by calculating a projection matrix of a camera using the vanishing line, the vanishing points, and an object height.

14. The normalized metadata generation method of claim 13, wherein the projection matrix projects an object on the two-dimensional image onto the three dimensional world coordinates which are not affected by camera parameters.

15. The normalized metadata generation method of claim 6, wherein internal parameters and external parameters of the camera are estimated using the detected vanishing line and the vanishing points, and
   wherein the internal parameters include a focal length, a principal point and an aspect ratio, and the external parameters include a panning angle, a tilting angle, a rolling angle, a camera height with respect to the z-axis, transformation in x-axis and y-axis directions.

16. The normalized metadata generation method of claim 1, wherein the compensating of the colors includes
   estimating a color of a light source by calculating a modified Minkowsky norm based color considering local correlation using the following equation; and $$\left(\frac{\int (f^{\sigma}(x))^p dx}{\int dx}\right)^{1/p} = ke$$

where f(x) represents an image defined as an image $x=[x\ y]^T$, $f^{\sigma}=f*G^{\sigma}$, filtered by the Gaussian filter $G^{\sigma}$ and the Minkowsky norm p,
   compensating the estimated color of the light source using the following equation[H]:

$$f_{corr}^c = f_c/\omega_c^3, \text{ for } c\in\{R,G,B\}$$

where $f_{corr}^c$ represents a color-corrected c-channel image, $f_c$ represents a c-channel image and $\omega_c$ represents a scaling parameter.

17. The normalized metadata generation method of claim 1, wherein the extracting of the representative color information includes
extracting the representative color information of the object by performing K-means clustering on the object region detected from the two-dimensional image of which the colors are compensated.

18. The normalized metadata generation method of claim 1, wherein the non-color metadata includes size information including the height and width of the object, moving speed information of the object, aspect ratio information, and trajectory information.

19. The normalized metadata generation method of claim 18, wherein the height ($H_O$) is calculated by the following equation:

$$H_O = \frac{(P_{2,1} - P_{3,1} \cdot y)X + (P_{2,2} - P_{3,2} \cdot y)Y + P_{2,2} - P_{3,2} \cdot y}{P_{3,3} \cdot y - P_{2,3}}$$

where P denotes the projection matrix, y denotes the y coordinate on the image plane.

20. The normalized metadata generation method of claim 18, wherein the width ($W_O$) is calculated by the following equation:

$$W_o = |X_o - X'_o| \cdot W_i$$

where $X_O$ represents a foot position on the three-dimensional world coordinates, $X'_O$ represents a foot position corresponding to one pixel-shifted foot position on the image plane, and W, represents a width of the object on the image plane.

21. The normalized metadata generation method of claim 18, wherein the moving speed information ($S_o$) is calculated by the following equation:

$$S_o = \sqrt{(X_o^t - X_o^{t'})^2 + (Y_o^t - Y_o^{t'})^2}$$

where ($X_o^t$, $Y_o^t$) represents a position of the object on the world coordinates in a t-th frame, and ($X_o^{t'}$, $Y_o^{t'}$) represents a position of the object one second earlier.

22. The normalized metadata generation method of claim 18, wherein the aspect ratio ($R_o$) information is calculated by the following equation:

$$R_o = H_i / W_i$$

where $H_i$ and $W_i$ respectively represent the height and width of the object on the image plane.

23. The normalized metadata generation method of claim 18, wherein the trajectory information ($T_o$) is calculated using four positions on trajectory by the following equation:

$$T_o = [x_o^1, y_o^1, x_o^2, y_o^2, x_o^3, y_o^3, x_o^4, y_o^4]^T$$

where $[x_0 \ y_0]^T$ is the start position, $[x_1 \ y_2]^T$ is the 1/3 position, $[x_2 \ y_2]^T$ is the 2/3 position, and $[x_4 \ y_4]^T$ is the end position.

24. A normalized metadata generation device for a multi-camera-based video surveillance system including different kinds of cameras, the device comprising:
a memory configured to store instructions; and
a processor configured to execute the instructions,
wherein the instructions execute a normalized metadata generation method comprising:
generating a multi-ellipsoid based three-dimensional (3D) human model using perspective features of a plurality of two-dimensional (2D) images obtained by the multiple cameras;
performing a scene calibration based on the 3D human model to normalize object information of an object included in the 2D images; and
generating normalized metadata of the object from the two-dimensional images on which the scene calibration is performed
wherein the generating of the normalized metadata of the object includes:
compensating colors of the two-dimensional (2D) image;
extracting representative color information;
extracting non-color metadata; and
integrating the extracted metadata into one data model.

* * * * *